(12) United States Patent
Martin et al.

(10) Patent No.: US 10,182,419 B2
(45) Date of Patent: Jan. 15, 2019

(54) TELECOMMUNICATIONS APPARATUS AND METHODS

(71) Applicant: SONY CORPORATION, Tokyo (JP)

(72) Inventors: Brian Alexander Martin, Basingstoke (GB); Hideji Wakabayashi, Basingstoke (GB); Shinichiro Tsuda, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/544,106

(22) PCT Filed: Jan. 7, 2016

(86) PCT No.: PCT/EP2016/050185
§ 371 (c)(1),
(2) Date: Jul. 17, 2017

(87) PCT Pub. No.: WO2016/120037
PCT Pub. Date: Aug. 4, 2016

(65) Prior Publication Data
US 2018/0007495 A1    Jan. 4, 2018

(30) Foreign Application Priority Data
Jan. 29, 2015   (EP) .................................... 15153004

(51) Int. Cl.
*H04W 72/02* (2009.01)
*H04W 4/70* (2018.01)
(Continued)

(52) U.S. Cl.
CPC ............. *H04W 72/02* (2013.01); *H04W 4/70* (2018.02); *H04W 72/0413* (2013.01); *H04W 88/04* (2013.01); *H04W 88/06* (2013.01)

(58) Field of Classification Search
CPC ....... H04W 72/00–72/14; H04W 4/70; H04W 88/04; H04W 88/06
See application file for complete search history.

(56) References Cited

U.S. PATENT DOCUMENTS

| | | | |
|---|---|---|---|
| 8,520,621 B2* | 8/2013 | Tee | H04L 5/001 370/329 |
| 2011/0216723 A1* | 9/2011 | Sartori | H04L 1/0003 370/329 |

(Continued)

FOREIGN PATENT DOCUMENTS

| | | |
|---|---|---|
| EP | 2408234 A1 | 1/2012 |
| WO | 2013/068788 A1 | 5/2013 |
| WO | 2014/175149 A1 | 10/2014 |

OTHER PUBLICATIONS

International Search Report dated Mar. 23, 2016, in PCT/EP2016/050185, filed Jan. 7, 2016.

(Continued)

*Primary Examiner* — Raymond Dean
(74) *Attorney, Agent, or Firm* — Xsensus LLP

(57) ABSTRACT

A method of operating first and second terminal devices for transmitting data in a device-to-device communication mode in a wireless telecommunications system supporting communications on a first carrier operating over a first frequency band and a second carrier operating over a second frequency band. The first terminal device transmits control signalling on the first carrier and this is received by the second terminal device. The control signalling comprises an indication of an allocation of radio resource blocks on the second carrier to be used for transmitting user-plane data from the first terminal device to the second terminal device. The first terminal device then proceeds to transmit the user-plane data to the second terminal device on the second carrier using the radio resource blocks on the second carrier (Continued)

identified by the control signalling. The control signalling may also provide an indication of an allocation of radio resource blocks on the first carrier to be used for transmitting user-plane data to the second terminal device.

15 Claims, 10 Drawing Sheets

(51) Int. Cl.
*H04W 72/04* (2009.01)
*H04W 88/04* (2009.01)
*H04W 88/06* (2009.01)

(56) References Cited

U.S. PATENT DOCUMENTS

| | | | |
|---|---|---|---|
| 2012/0015607 | A1 | 1/2012 | Koskela et al. |
| 2012/0300662 | A1 | 11/2012 | Wang et al. |
| 2013/0170387 | A1 | 7/2013 | Wang et al. |
| 2014/0247802 | A1 | 9/2014 | Wijting et al. |
| 2015/0327240 | A1* | 11/2015 | Yamada ............ H04W 72/02 455/426.1 |
| 2016/0037322 | A1 | 2/2016 | Nguyen et al. |
| 2016/0183276 | A1* | 6/2016 | Marinier ............ H04W 72/02 370/329 |

OTHER PUBLICATIONS

Holma et al.. "LTE for UMTS: OFDMA and SC-FDMA Based Radio Access". 2009. 4 pages. ISBN 978-0-470-99401-6.
Samsung. "CSMA/CA based resource selection", R2-133840. 3GPP TSG-RAN WG2 #84, Nov. 11-15, 2013, 4 pages.
Orange et al., "Network control for Public Safety D2D Communications", R2-133990, 3GPP TSG-RAN WG2 Meeting #84, Nov. 11-15, 2013, 5 pages.
General Dynamics Broadband UK, "The Synchronizing Central Node for Out of Coverage D2D Communication", R2-134246, 3GPP TSG-RAN WG2 Meeting #84, Nov. 11-15, 2013, 3 pages.
LG Electronics Inc., "Medium Access for D2D Communication", R2-134426, 3GPP TSG-RAN WG2 Meeting #84, Nov. 11-15, 2013, 9 pages.
Ericsson, "D2D Scheduling Procedure", R2-134238, 3GPP TSG-RAN WG2 Meeting #84, Nov. 11-15, 2013, 7 pages.
General Dynamics Broadband UK, "Possible mechanisms for resource selection in connectionless D2D voice Communication". R2-134248, 3GPP TSG-RAN WG2 Meeting #84, Nov. 11-15, 2013, 9 pages.
General Dynamics Broadband UK, "Simulation results for D2D voice services using connectionless approach", R2-134431, 3GPP TSG-RAN WG2 Meeting #84, Nov. 11-15, 2013, 6 pages.
Xiaogang et al., "D2D Resource Allocation under the Control of BS", University of Electronic Science and Technology of China, Uploaded to IEEE on Aug. 10, 2013, 7 pages, https://mentor.ieee.org/802.16/dcn/13/16-13-0123-02-000n-d2d-resource-allocation-under-the-control-of-bs.docx.
Qualcomm Incorporated, "Study on LTE Device to Device Proximity Services", RP-122009, 3GPP TSG RAN Meeting #58, Dec. 4-7, 2012, 6 pages.
"3rd Generation Partnership Project; Technical Specification Group Radio Access Network; Study on LTE device to Device Proximity Services; Radio Aspects (Release 12)", 3GPP TR 36.843 V12.0.1, Mar. 2014, 50 pages.
Qualcomm Incorporated, "Work Item Proposal for Enhanced LTE Device to Device Proximity Services", RP-141902, 3GPP TSG RAN Meeting #66, Dec. 8-11, 2014, 7 pages.
Qualcomm Incorporated, "Work item proposal on LTE Device to Device Proximity Services", RP-140518, 3GPP TSG RAN Meeting #63, Mar. 3-6, 2014, 7 pages.
"3rd Generation Partnership Project; Technical Specification Group Radio Access Network; HSPDA Multipoint Transmittaion; (Release 11)", GFPP TR 25.872 V2.0.0, Sep. 2011, 28 pages, XP050553765.

* cited by examiner

TELECOMMUNICATIONS APPARATUS AND METHODS

CROSS-REFERENCE TO RELATED APPLICATIONS

The present application claims priority to PCT/EP2016/050185, filed Jan. 7, 2016, which claims the benefit of priority to European Patent Application 15 153 004.5, filed in the European Patent Office on 29 Jan. 2015, the entire contents of which being incorporated herein by reference.

BACKGROUND

Field

The present disclosure relates to telecommunications apparatus and methods, and in particular to telecommunications apparatus and methods for use in wireless telecommunications systems in which terminal devices are configured to perform device-to-device communications.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications devices, or when communications between communications devices are required but the communications devices may not be within reliable coverage of a base station supporting communications in the network. In order to help address these limitations there have been proposed approaches in which terminal devices (communications devices) within a wireless telecommunications system may be configured to communicate data directly with one another without some or all communications passing through an infrastructure equipment element, such as a base station. Such communications are commonly referred to as a device-to-device (D2D) communications.

Thus, D2D communications allow communications devices that are in sufficiently close proximity to directly communicate with each other, both when within the coverage area of a network and when outside a network's coverage area (e.g. due to geographic restrictions on a network's extent or because the network has failed or is in effect unavailable to a terminal device because the network is overloaded). D2D communications can allow user data to be more efficiently communicated between communications devices by obviating the need for user data to be relayed by a network entity such as a base station, and also allows communications devices to communicate with one another when one or both devices may not be within the reliable coverage area of a network. The ability for communications devices to operate both inside and outside of coverage areas makes wireless telecommunications systems that incorporate D2D capabilities well suited to applications such as public safety communications, for example. Public safety communications may benefit from a high degree of robustness whereby devices can continue to communicate with one another in congested networks and when outside a coverage area.

Fourth generation networks have therefore been proposed as a cost effective solution to public safety communications compared to dedicated systems such as TETRA (terrestrial trunked radio) which are currently used throughout the world.

The inventors have recognised one issue for consideration for D2D communications is how to help reduce the processing load associated with terminal devices monitoring for D2D communications they are to receive, especially in situations where there may be relatively large amounts of data being communicated to the terminal device in a D2D mode. Thus there is a need for apparatus and methods that can help with addressing these issues.

SUMMARY

According to an aspect of the disclosure there is provided a method of operating a first terminal device for transmitting data to a second terminal device in a device-to-device communication mode in a wireless telecommunications system supporting communications on a first carrier operating over a first frequency band and a second carrier operating over a second frequency band; the method comprising: transmitting on the first carrier control signalling comprising an indication of radio resources on the second carrier to be used for transmitting user-plane data from the first terminal device to the second terminal device; and transmitting user-plane data to the second terminal device on the second carrier using the radio resources on the second carrier indicated by the control signalling.

According to an aspect of the disclosure there is provided a first terminal device for transmitting data to a second terminal device in a device-to-device communication mode in a wireless telecommunications system supporting communications on a first carrier operating over a first frequency band and a second carrier operating over a second frequency band, wherein the first terminal device comprises a controller unit and a transceiver unit configured to operate together to transmit on the first carrier control signalling comprising an indication of radio resources on the second carrier to be used for transmitting user-plane data from the first terminal device to the second terminal device; and transmit user-plane data to the second terminal device on the second carrier using the radio resources on the second carrier indicated by the control signalling.

According to an aspect of the disclosure there is provided circuitry for a first terminal device for transmitting data to a second terminal device in a device-to-device communication mode in a wireless telecommunications system supporting communications on a first carrier operating over a first frequency band and a second carrier operating over a second frequency band, wherein the circuitry comprises a controller element and a transceiver element configured to operate together to cause the first terminal device to: transmit on the first carrier control signalling comprising an indication of radio resources on the second carrier to be used for transmitting user-plane data from the first terminal device to the second terminal device; and transmit user-plane data to the second terminal device on the second carrier using the radio resources on the second carrier indicated by the control signalling.

According to an aspect of the disclosure there is provided a method of operating a second terminal device for receiving data from a first terminal device in a device-to-device communication mode in a wireless telecommunications system supporting communications on a first carrier operating over a first frequency band and a second carrier operating over a second frequency band; the method comprising: receiving on the first carrier control signalling comprising an indication of radio resources on the second carrier to be used by the first terminal device for transmitting user-plane data to the second terminal device; and receiving user-plane data from the first terminal device on the second carrier using the radio resources on the second carrier indicated by the control signalling.

According to an aspect of the disclosure there is provided a second terminal device for receiving data from a first terminal device in a device-to-device communication mode in a wireless telecommunications system supporting communications on a first carrier operating over a first frequency band and a second carrier operating over a second frequency band, wherein the second terminal device comprises a controller unit and a transceiver unit configured to operate together to: receive on the first carrier control signalling comprising an indication of radio resources on the second carrier to be used by the first terminal device for transmitting user-plane data to the second terminal device; and receive user-plane data from the first terminal device on the second carrier using the radio resources on the second carrier indicated by the control signalling.

According to an aspect of the disclosure there is provided circuitry for a second terminal device for receiving data from a first terminal device in a device-to-device communication mode in a wireless telecommunications system supporting communications on a first carrier operating over a first frequency band and a second carrier operating over a second frequency band, wherein the circuitry comprises a controller element and a transceiver element configured to operate together to cause the second terminal device to: receive on the first carrier control signalling comprising an indication of radio resources on the second carrier to be used by the first terminal device for transmitting user-plane data to the second terminal device; and receive user-plane data from the first terminal device on the second carrier using the radio resources on the second carrier indicated by the control signalling.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
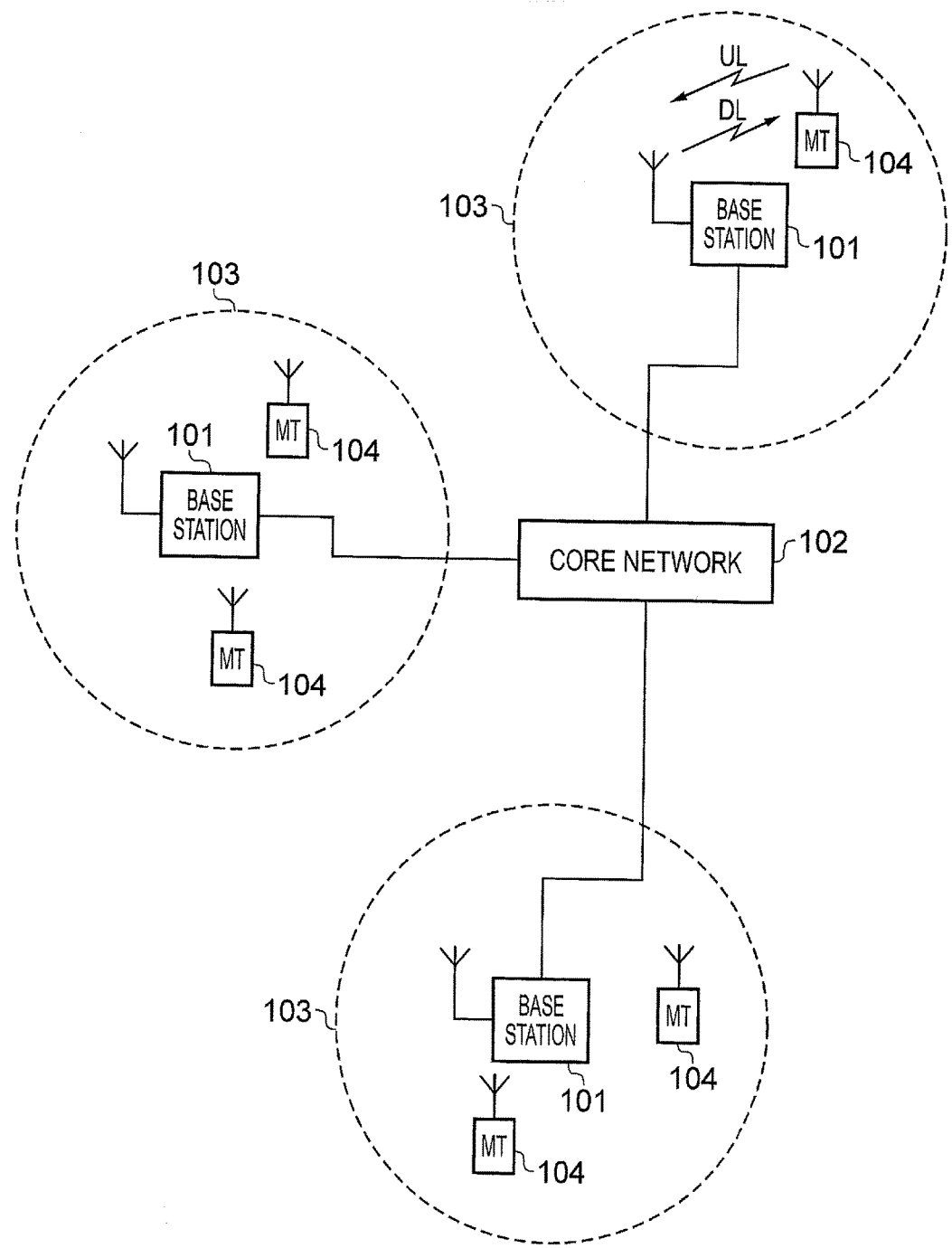
FIG. 1 provides a schematic diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP (RTM) body and also described in many books on the subject, for example, Holma H. and Toskala A [1]. It will be appreciated that operational aspects of the telecommunications network which are not specifically described below may be implemented in accordance with any known techniques, for example according to the relevant standards or variations thereof.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, and so forth. Base stations may also be referred to as transceiver stations/nodeBs/e-nodeBs, and so forth.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Figure 2A:
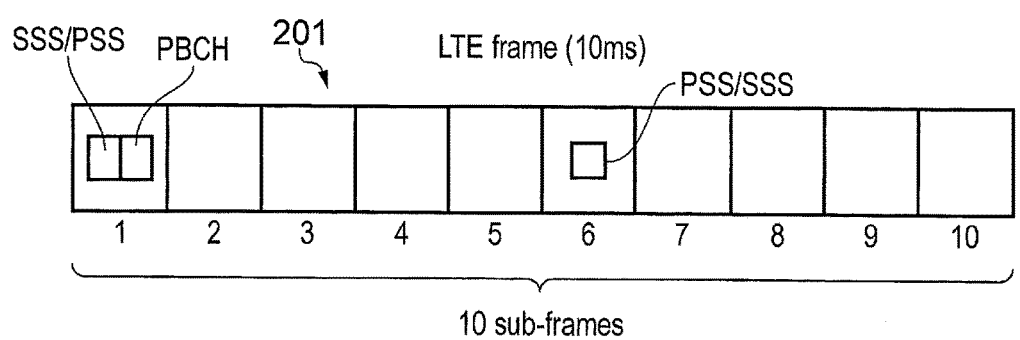
FIG. 2A provides a schematic diagram illustrating a LTE downlink radio frame.

FIG. 2A shows a schematic diagram illustrating an OFDM based LTE downlink radio frame 201. The LTE downlink radio frame is transmitted from a LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 2B:
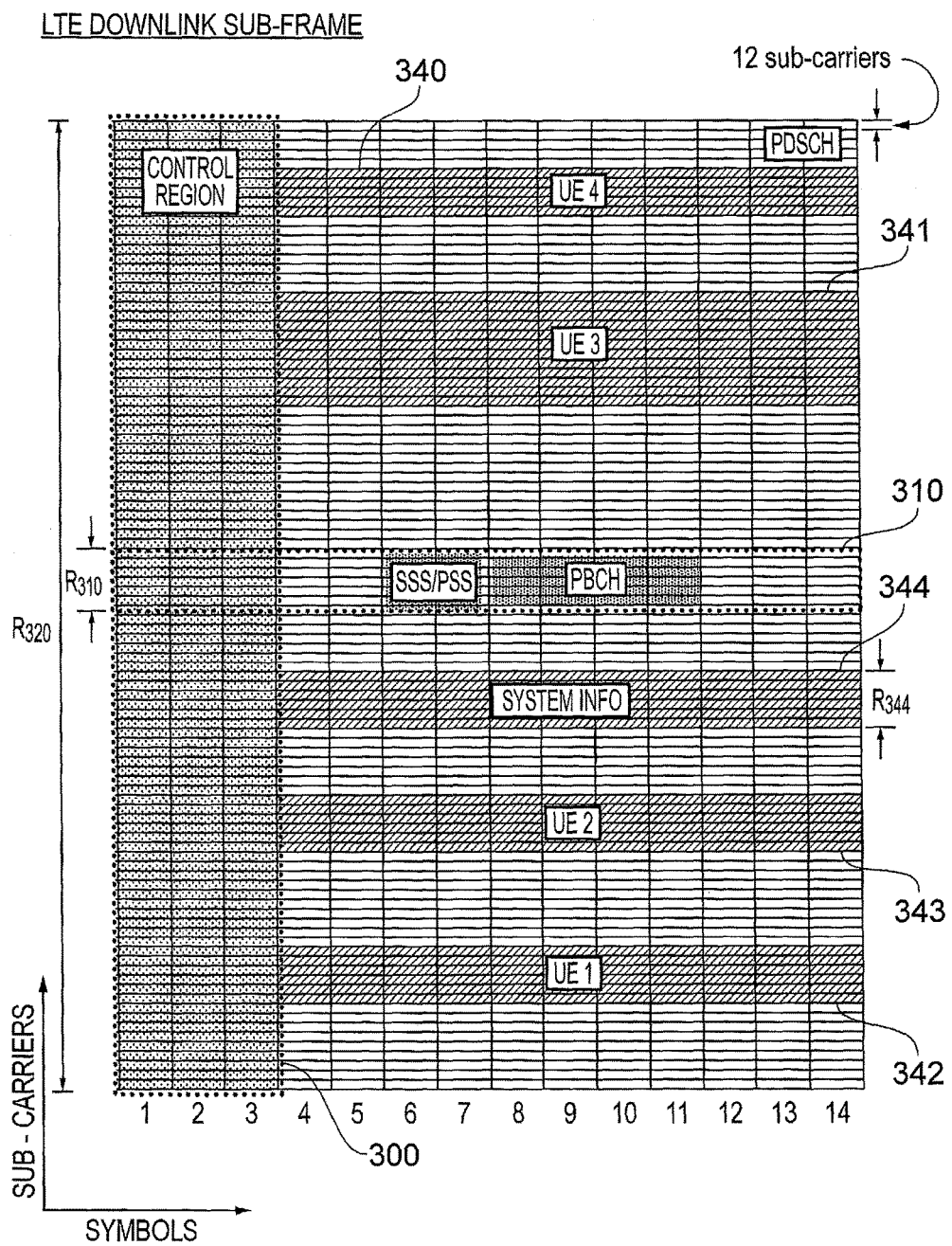
FIG. 2B provides a schematic diagram illustrating an example of a LTE downlink radio subframe.

FIG. 2B is a schematic diagram of a grid which illustrates the structure of an example conventional downlink LTE subframe. The subframe comprises a predetermined number of symbols which are transmitted over a 1 ms period. Each symbol comprises a predetermined number of orthogonal subcarriers distributed across the bandwidth of the downlink radio carrier.

The example subframe shown in FIG. 2B comprises 14 symbols and 1200 subcarriers spread across a 20 MHz bandwidth and in this example is the first subframe in a frame (hence it contains PBCH). The smallest allocation of physical resource for transmission in LTE is a resource block comprising twelve subcarriers transmitted over one subframe. For clarity, in FIG. 2B, each individual resource element is not shown, instead each individual box in the subframe grid corresponds to twelve subcarriers transmitted on one symbol.

FIG. 2B shows in hatching resource allocations for four LTE terminals 340, 341, 342, 343. For example, the resource allocation 342 for a first LTE terminal (UE 1) extends over five blocks of twelve subcarriers (i.e. 60 subcarriers), the resource allocation 343 for a second LTE terminal (UE2) extends over six blocks of twelve subcarriers (i.e. 72 subcarriers), and so on.

Control channel data can be transmitted in a control region 300 (indicated by dotted-shading in FIG. 2B) of the subframe comprising the first "n" symbols of the subframe where "n" can vary between one and three symbols for channel bandwidths of 3 MHz or greater and where "n" can vary between two and four symbols for a channel bandwidth of 1.4 MHz. For the sake of providing a concrete example, the following description relates to host carriers with a channel bandwidth of 3 MHz or greater so the maximum value of "n" will be 3 (as in the example of FIG. 2B). The data transmitted in the control region 300 includes data transmitted on the physical downlink control channel (PDCCH), the physical control format indicator channel (PCFICH) and the physical HARQ indicator channel (PHICH). These channels transmit physical layer control information. Control channel data can also or alternatively be transmitted in a second region of the subframe comprising a number of subcarriers for a time substantially equivalent to the duration of the subframe, or substantially equivalent to the duration of the subframe remaining after the "n" symbols. The data transmitted in this second region is transmitted on the enhanced physical downlink control channel (EPDCCH). This channel transmits physical layer control information which may be in addition to that transmitted on other physical layer control channels.

PDCCH and EPDCCH contain control data indicating which subcarriers of the subframe have been allocated by a base station to specific terminals (or all terminals or subset of terminals). This may be referred to as physical-layer control signalling/data. Thus, the PDCCH and/or EPDCCH data transmitted in the control region 300 of the subframe shown in FIG. 2B would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols for channel bandwidths of 3 MHz or greater and between two and four symbols for channel bandwidths of 1.4 MHz).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 subcarriers wide (corresponding to a transmission bandwidth of 1.08 MHz). The PSS and SSS are synchronisation signals that once detected allow a LTE terminal device to achieve frame synchronisation and determine the physical layer cell identity of the enhanced Node B transmitting the downlink signal. The PBCH carries information about the cell, comprising a master information block (MIB) that includes parameters that LTE terminals use to properly access the cell. Data transmitted to terminals on the physical downlink shared channel (PDSCH), which may also be referred to as a downlink data channel, can be transmitted in other resource elements of the subframe. In general PDSCH conveys a combination of user-plane data and non-physical layer control-plane data (such as Radio Resource Control (RRC) and Non Access Stratum (NAS) signalling). The user-plane data and non-physical layer control-plane data conveyed on PDSCH may be referred to as higher layer data (i.e. data associated with a layer higher than the physical layer).

FIG. 2B also shows a region of PDSCH containing system information and extending over a bandwidth of R344. A conventional LTE subframe will also include reference signals which are discussed further below but not shown in FIG. 2B in the interests of clarity.

The number of subcarriers in a LTE channel can vary depending on the configuration of the transmission network. Typically this variation is from 72 sub carriers contained within a 1.4 MHz channel bandwidth to 1200 subcarriers contained within a 20 MHz channel bandwidth (as schematically shown in FIG. 2B). As is known in the art, data transmitted on the PDCCH, PCFICH and PHICH is typically distributed on the subcarriers across the entire bandwidth of the subframe to provide for frequency diversity.

Figure 3:
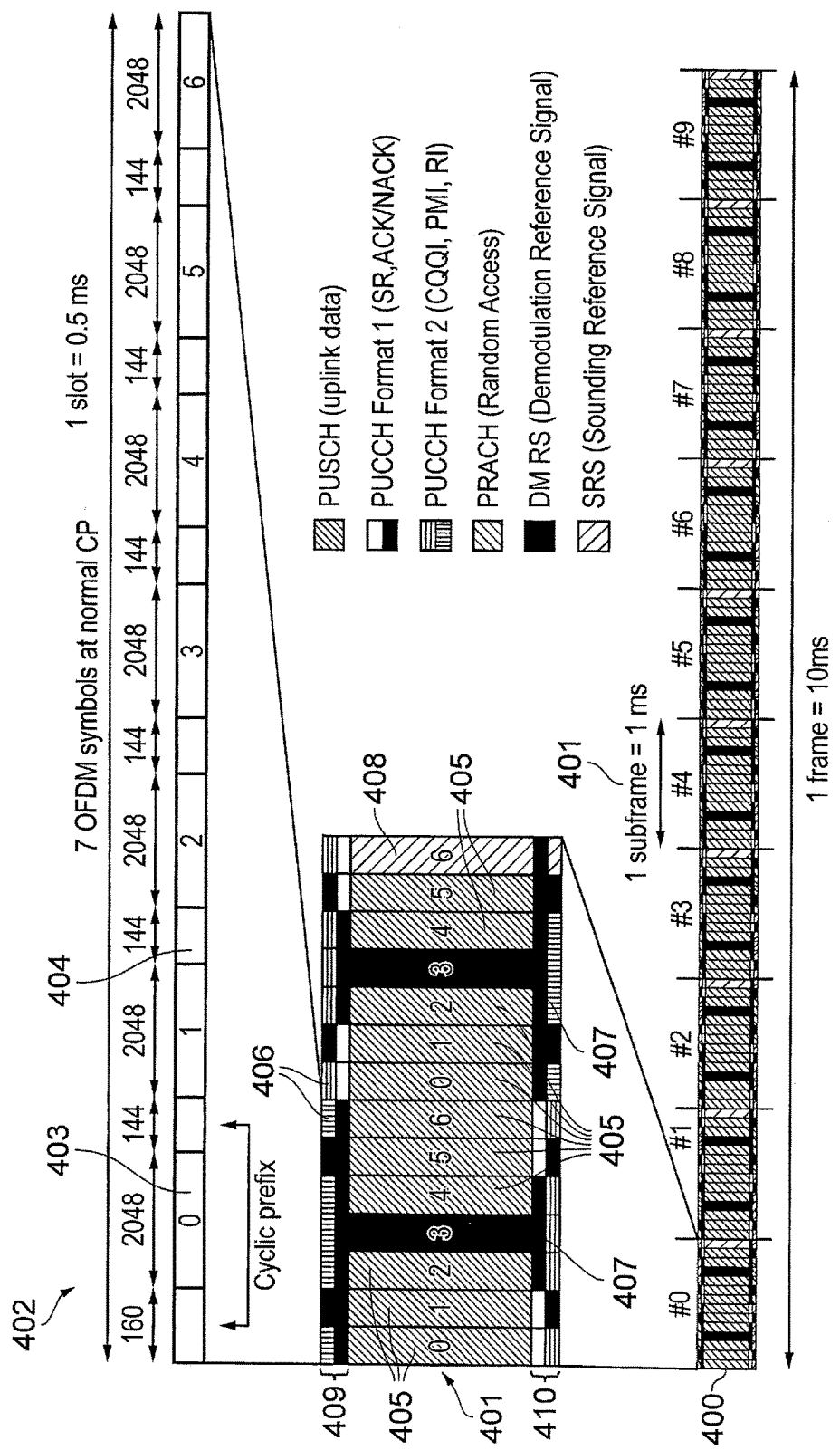
FIG. 3 provides a schematic diagram illustrating an example of a LTE uplink radio subframe.

FIG. 3 is a schematic diagram which illustrates some aspects of the structure of an example conventional uplink LTE subframe. In LTE networks the uplink wireless access interface is based upon a single carrier frequency division multiple access (SC-FDMA) interface and downlink and uplink wireless access interfaces may be provided by frequency division duplexing (FDD) or time division duplexing (TDD). In TDD implementations subframes switch between uplink and downlink subframes in accordance with predefined patterns and in FDD implementations the uplink and downlink channels are separated by frequency. Regardless of the form of duplexing used, a common uplink frame structure is utilised in LTE. The simplified representation of FIG. 3 illustrates such an uplink frame at different levels of resolution with a frame 400 of the uplink frame structure represented at the bottom of the figure, a subframe 401 represented in the middle of the figure, and a slot 402 represented at the top of the figure. Thus the frame 400 is divided in to 10 subframes 401 of 1 ms duration where each subframe 401 comprises two slots 402 of 0.5 ms duration. Each slot is then formed from seven OFDM symbols 403 (numbered 0 to 6 in FIG. 3) where a cyclic prefix 404 is inserted between each symbol. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a broadly similar manner to downlink subframes.

As is well known, each uplink subframe may include a plurality of different channels, for example a physical uplink shared channel (PUSCH) 405, a physical uplink control channel (PUCCH) 406, which may take various formats, and a physical random access channel (PRACH). The physical Uplink Control Channel (PUCCH) may carry control information such as ACK/NACK to the base station for downlink transmissions, scheduling request indicators (SRI) for terminal devices wishing to be scheduled uplink resources, and feedback of downlink channel state information (CSI) for example. The PUSCH may carry terminal device uplink data or some uplink control data. Resources of the PUSCH are granted via PDCCH, such a grant being typically triggered by communicating to the network the amount of data ready to be transmitted in a buffer at the terminal device. The PRACH may be scheduled in any of the resources of an uplink frame in accordance with one of a plurality of PRACH patterns that may be signalled to terminal device in downlink signalling such as system information blocks. As well as physical uplink channels, uplink subframes may also include reference signals. For example, demodulation reference signals (DMRS) 407 and sounding reference signals (SRS) 408 may be present in an uplink subframe where the DMRS occupy the fourth symbol of a slot in which PUSCH is transmitted and are used for decoding of PUCCH and PUSCH data, and where SRS are used for uplink channel estimation at the base station. Further information on the structure and functioning of the physical channels of LTE systems can be found in reference [1].

In an analogous manner to the resources of the PDSCH for downlink communications, resources of the PUSCH for uplink communications are scheduled or granted by the serving base station. Thus for data is to be transmitted by a terminal device, resources of the PUSCH are granted to the terminal device by the base station. At a terminal device, PUSCH resource allocation is achieved by the transmission of a scheduling request or a buffer status report to its serving base station. The scheduling request may be made, when there is insufficient uplink resource for the terminal device to send a buffer status report, via the transmission of Uplink Control Information (UCI) on the PUCCH when there is no existing PUSCH allocation for the terminal device, or by transmission directly on the PUSCH when there is an existing PUSCH allocation for the terminal device. In response to a scheduling request, the base station is configured to allocate a portion of the PUSCH resource to the requesting terminal device sufficient for transferring a buffer status report and then inform the terminal device of the buffer status report resource allocation via a DCI in the PDCCH.

Although similar in overall structure to downlink subframes, uplink subframes have a different control structure to downlink subframes, in particular an upper region 409 and a lower region 410 of subcarriers/frequencies/resource blocks of an uplink subframe are reserved for control signalling (as opposed to the initial symbols for a downlink subframe). Furthermore, although the resource allocation procedure for the downlink and uplink are similar, the actual structure of the resources that may be allocated may vary due to the different characteristics of the OFDM and SC-FDMA interfaces used in the downlink and uplink respectively. For example, for OFDM each subcarrier may be individually modulated and therefore it is not particularly significant whether frequency/subcarrier allocations are contiguous. However, for SC-FDMA the subcarriers are modulated in combination and therefore it can be more efficient to allocate contiguous frequency allocations for each terminal device.

As a result of the above described wireless interface structure and operation, one or more terminal devices may communicate data with one another via a coordinating base station, thus forming a conventional cellular telecommunications system. However, as noted above, there are also approaches for additionally allowing terminal devices to communicate directly with one another (i.e. without communications passing through a coordinating base station) using so-called device-to-device (D2D) modes of operation. As explained further below, it is expected that in at least some modes of D2D operation a subset of a network's radio resources will be reserved for D2D communications.

Figure 4:
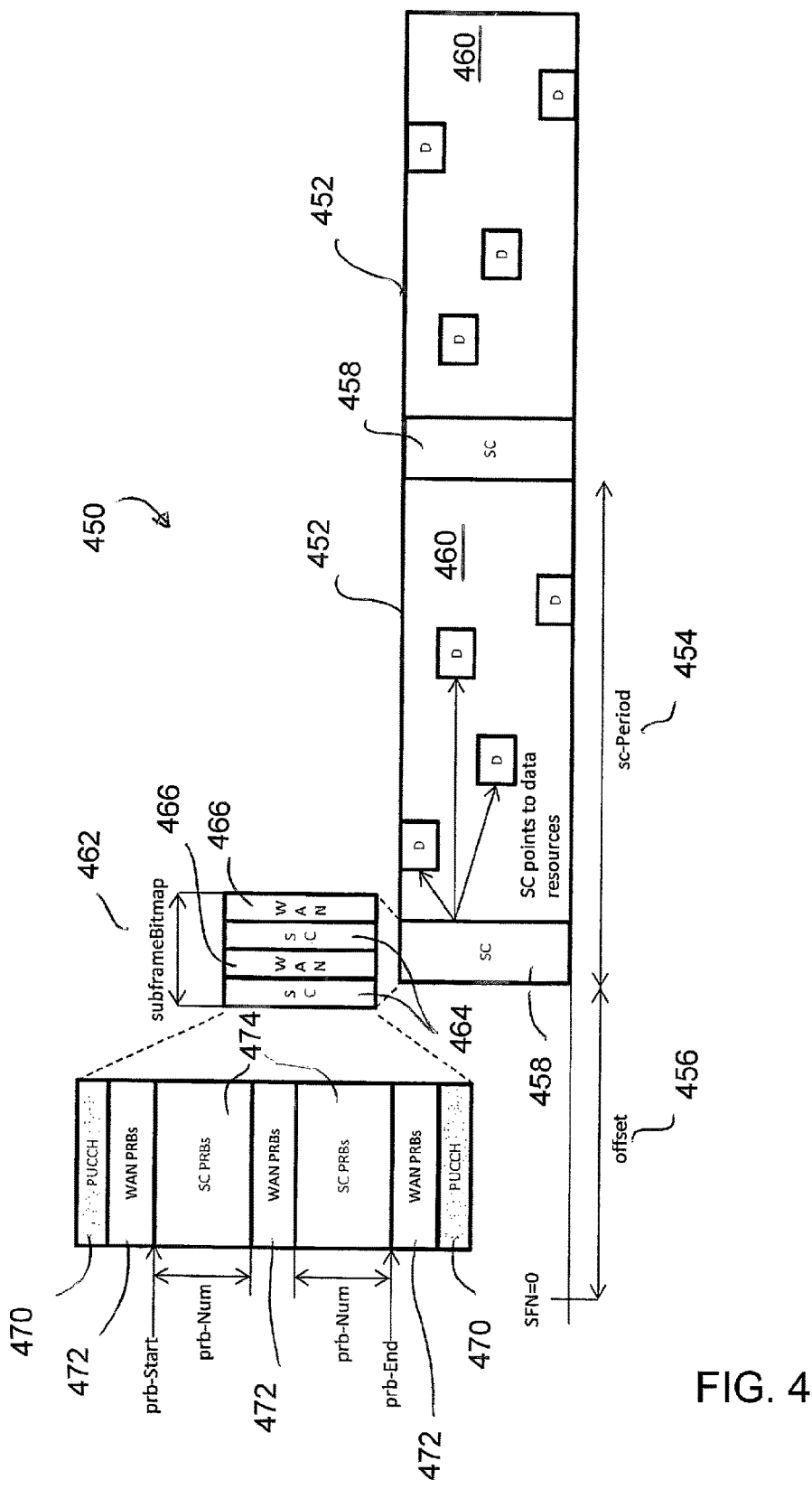
FIG. 4 provides a schematic diagram illustrating an example of a D2D frame structure.

FIG. 4 schematically represents a D2D frame structure 450 in an LTE Release 12 context. The basic frame structure 450 comprises a repeating pattern of D2D subframes 452 having a duration of "sc-Period" 454 with frame boundaries offset from the wireless telecommunications system frame number (SFN) by an amount "offset" 456. In a manner which is broadly similar to a LTE downlink subframe, each D2D subframe comprises a control region 458 and a higher-layer data region 460. Control signalling in the control region is used to provide indications of data resource allocations in the high-layer data region in respect of D2D transmissions. The respective control regions 458 are configured using a subframe bitmap 462 indicating regions of side-link control (SC) resources 464 while the other resources 466 are used for the wireless access network (WAN). These may be distributed in frequency across regions of side-link control physical resource blocks 474, whereby other regions contain physical uplink control channel (PUCCH) resources 470 and WAN physical resource blocks 472, as schematically represented in FIG. 4.

Figure 5:
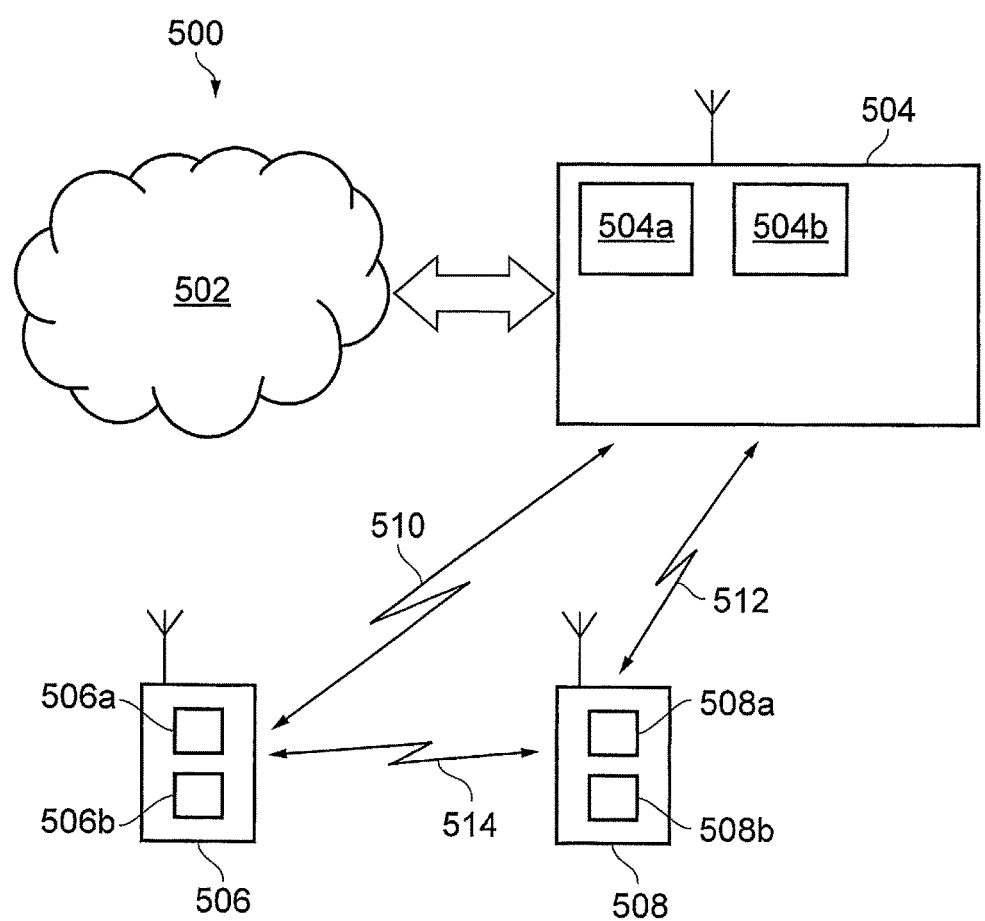
FIG. 5 schematically represents a wireless telecommunications system according to an embodiment of the disclosure.

FIG. 5 schematically shows a telecommunications system 500 according to an embodiment of the disclosure. The telecommunications system 500 in this example is based broadly on a LTE-type architecture with modifications to support device-to-device communications (i.e. direct signalling exchange between terminal devices to communicate data between them) generally in accordance with previously proposed schemes for D2D communications. As such many aspects of the operation of the telecommunications system 500 are already known and understood and not described here in detail in the interest of brevity. Operational aspects of the telecommunications system 500 which are not specifically described herein may be implemented in accordance with any known techniques, for example according to the established LTE-standards and known variations and modifications thereof (e.g. to provide/introduce support for D2D communications).

The telecommunications system 500 comprises a core network part (evolved packet core) 502 coupled to a radio network part. The radio network part comprises a base station (evolved-nodeB) 504, a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 5 in the interests of simplicity.

As with a conventional mobile radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service, EPS, connections with the terminal devices 506, 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 5 may be broadly conventional apart from where modified to provide functionality in accordance with embodiments of the disclosure as discussed herein.

The first and second terminal devices 506, 508 are D2D enabled devices configured to operate in accordance with embodiments of the present disclosure as described herein. The terminal devices 506, 508 each comprise a transceiver unit 506a, 508a for transmission and reception of wireless signals and a controller unit 506b, 508b configured to control the respective terminal devices 506, 508. The respective controller units 506b, 508b may each comprise a processor unit which is suitably configured/programmed to provide the desired functionality using conventional programming/configuration techniques for equipment in wireless telecommunications systems. The respective transceiver units 506a, 508a and controller units 506b, 508b are schematically shown in FIG. 5 as separate elements. However, it will be appreciated for each of the terminal devices the functionality of the terminal devices receiver and controller units can be provided in various different ways, for example using a single suitably programmed general purpose computer, or suitably configured application-specific integrated circuit(s)/circuitry. It will be appreciated the first and second terminal devices 506, 508 will in general comprise various other elements associated with their operating functionality in accordance with established wireless telecommunications techniques (e.g. a power source, possibly a user interface, and so forth).

The base station 504 is configured to support communications with the terminal devices and may also play a role in configuring aspects of D2D communications between the terminal devices, for example establishing which radio resources may be used for D2D communications between terminal devices operating within the coverage area of the base station 504. The base station 504 comprises a transceiver unit 504a for transmission and reception of wireless signals and a controller unit 504b configured to control the base station 504. The controller unit 504b may comprise a processor unit which is suitably configured/programmed to provide the desired functionality using conventional programming/configuration techniques for equipment in wireless telecommunications systems. The transceiver unit 504a and the controller unit 504b are schematically shown in FIG. 5 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 504 will in general comprise various other elements associated with its operating functionality. For example, the base station 504 will in general comprise a scheduling entity responsible for scheduling communications. The functionality of the scheduling entity may, for example, be subsumed by the controller unit 504b.

Thus, the base station 504 is configured to communicate data with the first terminal device 506 over a first radio communication link 510 and communicate data with the second terminal device 508 over a second radio communication link 512. Both radio links may be supported within a single radio frame structure associated with the base station 504. It is assumed here the base station 504 is configured to communicate with the terminal devices 506, 508 over the respective radio communication links 510, 512 generally in accordance with the established principles of LTE-based communications.

However, in addition to the terminal devices 506, 508 being arranged to communicate data to and from the base station (transceiver station) 504 over the respective first and second radio communication links 510, 512, the terminal devices 506, 508 are further arranged to communicate with one another (and other terminal devices within the wireless telecommunications system) in a device-to-device (D2D) manner over a D2D radio communication link 514, as schematically indicated in the figure. The underlying principles of the D2D communications supported in the wireless telecommunications system of FIG. 5 may follow any previously proposed techniques, but with modifications to support approaches in accordance with embodiments of the disclosure as described herein.

There are a number of possible approaches to the implementation of D2D communications within an LTE-based wireless telecommunications system that have been proposed for different scenarios.

Some approaches may rely on a coordinating entity, such as a base station or other network entity, to allocate specific transmission resources for use by respective terminal devices to transmit data. For example, resources within the wireless access interface provided for communications between terminal devices and a base station may be used for D2D communications and a base station may allocate resources for specific D2D communications. That is to say, the base station may be responsible for scheduling which terminal devices transmit D2D communications on which resources in a broadly similar manner to the way in which the base station is responsible for scheduling conventional uplink communications. Thus terminal devices may receive control signalling from the base station to indicate which resources they should use for transmitting user data to another terminal device in a D2D manner. This type of approach may generally be referred to as a Mode 1 approach.

Other approaches may not rely on any coordinating entity for managing access to radio resources by terminal devices undertaking D2D communications. For example it has been proposed in document R2-133840 [2] to use a Carrier Sense Multiple Access, CSMA, approach to provide a degree of co-ordination for D2D transmissions by terminal devices through contention based scheduling by each terminal device. In effect each terminal device first listens to identify which resources are currently being used, and then schedules its own transmissions on unused resources. This type of approach may generally be referred to as a Mode 2 approach.

Thus, in some respects, a Mode 1 approach may be seen as an approach in which access to resources for D2D communications is scheduled by a coordinating entity whereas a Mode 2 approach may be seen as an approach in which access to resources for D2D communications are not scheduled by a coordinating entity and are contention based.

Some proposed arrangements include those in which a terminal device acts as a controlling entity for a group of terminal devices to co-ordinate transmissions of the other members of the group. Examples of such proposals are provided in the following disclosures:

[3] R2-133990, Network control for Public Safety D2D Communications; Orange, Huawei, HiSilicon, Telecom Italia

[4] R2-134246, The Synchronizing Central Node for Out of Coverage D2D Communication; General Dynamics Broadband UK

[5] R2-134426, Medium Access for D2D communication; LG Electronics Inc

In some respects these approaches may be seen as variations of a Mode 1 approach in which a "master" terminal device plays a role corresponding to that of a base station in allocating (scheduling) D2D resources among terminal devices wishing make D2D communications.

In other arrangements a transmitting terminal device operating in a group of D2D capable devices and which has data to transmit to one or more of the other terminal devices in the group may first send a scheduling assignment (side-link control) message providing an indication of radio resources which the transmitting terminal device intends to use for communicating the D2D data. The transmitting terminal device may then transmit the D2D data on the indicated radio resources without a central scheduling terminal device or controlling entity controlling the transmissions. The following disclosures provide examples of this de-centralised arrangement:

[6] R2-134238, D2D Scheduling Procedure; Ericsson;

[7] R2-134248, Possible mechanisms for resource selection in connectionless D2D voice communication; General Dynamics Broadband UK;

[8] R2-134431, Simulation results for D2D voice services using connectionless approach, General Dynamics Broadband UK In particular, the last two disclosures listed above, R2-134248 [7], R2-134431 [8], disclose the use of a scheduling channel, used by terminal devices to indicate their intention to schedule data along with the resources that will be used. The other disclosure, R2-134238 [6], does not use a scheduling channel as such, but deploys at least some predefined resources to send the scheduling assignments (side-link control). These approaches may be seen as Mode 2 type approaches.

Other example arrangements disclosed in [9] and [10] require a base station to provide feedback to the communications devices to control their transmissions. Document [11] discloses an arrangement in which a dedicated resource exchanging channel is provided between cellular user equipment and device-to-device user equipment for interference control and resource coordination.

It is to be expected that device-to-device communications when implemented in the context of an existing LTE-based wireless telecommunications network will use transmission resources associated within the existing LTE radio interface. In particular, it is expected that device-to-device communications will use radio resources from within the existing LTE uplink frame structure. There are various reasons for this. For example, traffic profiles in wireless telecommunications systems are typically such that an uplink channel is more likely to have more spare capacity then a downlink channel. Furthermore, the downlink channel is associated with more powerful transmissions from a base station and these are more likely to swamp and interfere with device-to-device communications.

One factor that is expected to be significant in determining the manner in which terminal devices undertake D2D communications is the extent to which the terminal devices are within network coverage. For example, terminal devices which are outside network coverage may be expected to operate according to Mode 2 in the absence of any coordinating information from a base station (although such terminal devices could operate in accordance with Mode 1 with a selected terminal device taking on the role of centralised scheduling/coordination). Terminal devices within network coverage might be expected to operate according to Mode 1, since centralised control will generally provide improved performance (for example with reduced contention). Furthermore, in some circumstances there may be terminal devices undertaking D2D communications while they are in an area of poor coverage, for example at a cell edge. In this respect the terminal devices may be able to receive some communications from the base station, for example system information broadcasts, but may not be able to reliably receive other routine communications, for example resource allocation signalling. In this scenario the terminal devices may operate according to Mode 2, but nonetheless receive some configuration information from the base station regarding the overall resources available for supporting D2D communications in the wireless telecommunications system.

It is expected that D2D communications within a cell served by a base station will be restricted to a subset of transmission resources (in terms of times and/or frequency) selected from the overall range of transmission resources available in the cell. Furthermore, it is expected for some implementations the restricted subset of transmission resources available for supporting D2D communications (e.g. the radio communication link 514 in FIG. 5) will not be available for supporting conventional uplink/downlink signalling (e.g. the radio communication links 510, 512 in FIG. 5). In this regard the set (pool) of resources to be made available for supporting D2D communications may be considered as being reserved for D2D communications.

Thus to summarise, a portion of the transmission resources (e.g. one or more blocks of time and/or frequency) that would otherwise be available for communications between a base station and terminal devices may be used for communications directly between terminal devices in accordance with a device-to-device operating mode. The specific resources that may be used for D2D communications, e.g. in terms of time and frequency resources, within a given wireless telecommunications system may come from within the range of frequencies assigned for conventional uplink or downlink resources. However, as noted above, it is more likely that D2D communications will make use of radio resources within the host wireless telecommunications system's uplink resources. The manner in which the resources available for D2D are spread throughout the communication cell's overall operating bandwidth may be different in different implementations. In some cases the pool of resources that may be used for D2D communications may be contiguous in time and frequency (e.g. corresponding to a continuous band of resources within a frame structure such as represented in FIG. 2B, for example). In other cases the pool of resources for supporting D2D communications may be non-contiguous in time and/or frequency. For example, in one implementation the transmission resources available for D2D communications may comprise a continuous band of frequencies within the overall cell bandwidth, but D2D communications may not be available in every (sub)frame. In another example, the D2D communications may be supported in every subframe, but may use non-contiguous frequencies. More generally, the specific arrangement of transmission resources available for D2D communications in terms of absolute times and frequencies is not significant. For ease of explanation the embodiments described herein will assume there is a contiguous time and resource grid available for D2D communications, but in some respects this may be considered to represent a logically contiguous baseband arrangement, while the actual arrangement of radio resources in terms of absolute time and frequency elements may be non-contiguous.

It will be appreciated the specific nature of the physical layer signalling and protocols adopted for D2D communications is not significant to the principles of operation described herein. It will be assumed here that D2D communications are based on a radio frame structure comprising blocks of time and frequency resources corresponding to those used for downlink communications in a conventional LTE system (e.g. based on the principles represented in FIGS. 2 and 3). However, in other implementations different frame structures may be employed.

Thus, D2D communications can allow terminal devices operating in a wireless telecommunications system to communicate directly with one another, and this can be regardless of whether or not the terminal devices are within the coverage area of a base station operating in the wireless telecommunications system. As discussed above, this can allow data to be more efficiently communicated from one terminal device to another (because there is no need for the data to be separately transmitted in uplink and then again in downlink).

Furthermore, because the terminal devices can communicate even when there is no network coverage, device-to-device operating modes can be well-suited to application such as public safety communications, for example. This is because D2D communications between terminal devices, for example terminal devices associated with emergency responders, can continue to communicate with each other in congested networks and when outside a coverage area (for example because of network failure).

In order to improve data rates (for example to support video streaming) between terminal devices, or to improve communication reliability by combining multiple transmissions of the same data, one option for a D2D context would be to utilise multiple carrier operation. That is to say, a device-to-device communications link between a first terminal device and a second terminal device may be configured to make use of two (or more) logical carriers. This may be particularly beneficial in broadcast-scenarios in which a single terminal device transmits data for reception by a plurality of receiving terminal devices in a device-to-device operating mode.

To help support multiple-carrier operation in a D2D context, certain embodiments of the disclosure propose an arrangement in which a first terminal device may transmit data to a second terminal device in a device-to-device communication mode in a wireless telecommunications system supporting communications on a first carrier operating over a first frequency band (F1) and a second carrier operating over a second frequency band (F2). In accordance with certain embodiments of the disclosure, the first terminal device may communicate user-plane data (higher-layer data) using both carriers based on control signalling comprising scheduling assignment information transmitted on one of the carriers. Such scheduling announcement control signalling may also be referred to as side-link control signalling. In an LTE context, scheduling announcements/side-link control signalling may broadly be seen as a D2D equivalent of PDCCH resource allocation signalling.

This approach can be advantageous in certain implementations for a number of reasons. For example, in some implementations it can reduce the overall amount of control signalling required to support multicarrier D2D operation. This can be important because in some D2D implementations there may be restrictions on the radio resources comprising the respective carriers which the terminal devices may use for D2D communications, for example to facilitate coexistence with conventional communications between a base station and terminal devices operating on the same carrier frequencies. It can therefore be important to use the resources available for D2D communications as efficient as possible. In particular, in a scenario in which there may be a relatively large number of separate device-to device communications, it can be important to make efficient use of the radio resources available for control signalling to avoid a situation in which there might be radio resources available for transmitting user-plane data, but insufficient resources for the control signalling needed to allocate these radio resources for use.

Thus, in accordance with certain embodiments of the disclosure, D2D scheduling announcement signalling (control signalling) transmitted on one carrier may provide an indication of radio resources on both carriers to be used for user-plane (higher-layer) data. This can be achieved in several ways, and some examples are discussed further below.

In accordance with some other embodiments of the disclosure, D2D scheduling announcement signalling (side-link control signalling) transmitted on one carrier may provide an indication of radio resources on the other carrier, without providing an indication of radio resources on the carrier in which the control signalling is sent. Although this approach does not take maximum advantage of the higher throughput available for user-plane by using multiple carriers, it can nonetheless be a useful approach in some scenarios. For example, in a multicarrier D2D context a transmitting terminal device may be free to select from any of the carriers for transmitting user-plane data, for example based on resource availability. However, it can nonetheless be helpful for the transmitting terminal device to communicate its scheduling announcements on only one of the carriers. This is so that a receiving terminal device needs only monitor one carrier to identify when D2D transmissions are to be made to the receiving device. This can be particularly relevant for terminal devices which are only able to receive a single carrier any given time. Likewise, some wireless telecommunications systems may provide a dedicated carrier for communicating public-safety related D2D user-plane data that is separate from a carrier used for routine communications. In this case it can be beneficial for the carrier for routine communications to provide side-link control signalling relating to the dedicated public-safety related carrier to avoid terminal devices having to permanently monitor the dedicated carrier.

Having set out some of the principles underlying certain embodiments of the disclosure, some more specific examples of the approaches discussed above will now be described with reference to FIGS. 6 to 11.

Figure 6:
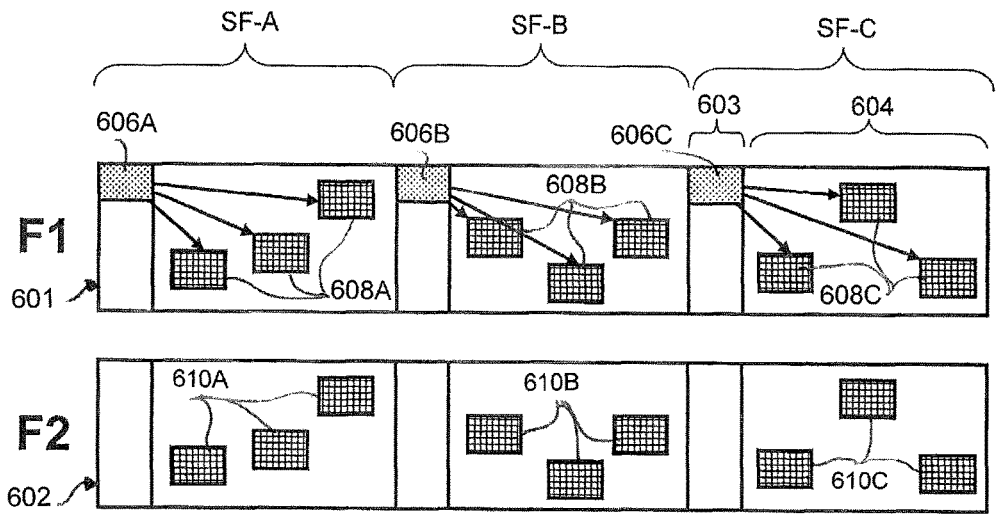
FIGS. 6 to 10 schematically represent radio resources used for communicating user-plane data from a first terminal device to a second terminal device and associated resource allocation signalling on first and second carriers in accordance with certain embodiments of the disclosure.

FIG. 6 schematically represents an arrangement of radio resources used to support D2D communications between the first terminal device 506 and the second terminal device 508 represented in FIG. 5 in accordance with an embodiment of the disclosure. In this example it is assumed the first terminal device 506 transmits data to the second terminal device 508 in a D2D operating mode using two logical carriers 601, 602. In this regard it will be appreciated the contents of the data and the reason why the first terminal device is transmitting the data to the second terminal device in the D2D operating mode are not significant to the principles underlying the operating principles described herein. It will further be appreciated that in some implementations the first terminal device may be involved in transmitting the relevant-data in a broadcast mode. That is to say, the data may be transmitted from the first terminal device to a plurality of other terminal devices, of which the second terminal device represented in FIG. 5 is only one.

Thus the radio resources are provided by a first logical carrier 601 (uppermost in FIG. 6) operating over a first frequency band F1 and a second logical carrier 602 (lowermost in FIG. 6) operating over a second frequency band F2. Each carrier in FIG. 6 comprises an arrangement of radio resource blocks arranged in time (horizontal direction in the figure) and frequency (vertical direction in the figure). The specific radio resources comprising the respective carriers (e.g. in terms of absolute frequencies) may be established in accordance with conventional multicarrier techniques in wireless telecommunications systems, for example based on which frequencies are available for use by the operator of the wireless telecommunications system and how the operator of the wireless telecommunications system has chosen to deploy the network on these frequencies to support D2D operations.

In this example it is assumed the D2D communication mode employs a radio frame structure which broadly corresponds with an LTE-type downlink radio frame structure (e.g. of the kind represented in FIG. 2B). Accordingly, each of the first and second carriers support a D2D radio interface having a radio frame structure comprising a plurality of radio subframes. For each carrier represented in FIG. 6, three subframes are shown, these are labelled in FIG. 6 as SF-A, SF-B and SF-C (these labels will be taken to apply for all of FIGS. 6 to 10 and 12). It will be appreciated there will in general be more radio subframes to the left and right of those represented in the figure. In this example the subframes on each carrier are synchronised in time. That is to say, subframe SF-A on the first carrier 601 and corresponding subframe SF-A on the second carrier 602 are at the same times, and likewise for the SF-B and SF-C. In this example each subframe comprises a control region 603 and a user-plane region 604, and in terms of their functionality, these regions 603, 604 may respectively correspond with PDCCH and PDSCH regions in a conventional LTE downlink subframe (these reference numerals for the control regions 603 and user-plane regions 604 will be taken to apply for all of FIGS. 6 to 10 and 12). The transmitting terminal device 506 may thus transmit resource allocation signalling in the control region 603 of a subframe to provide an indication of radio resources in the user-plane data region 604 which are to be used for transmitting data to the receiving terminal device 508 identified in the resource allocation signalling. In this regard the signalling protocols used by the transmitting terminal device 506 for allocating radio resources to the receiving terminal device 508 may be generally based on the same protocols as resource allocation signalling used by a base stations for conventional LTE downlink communications unless modified to support embodiments of the present disclosure as described herein. For example, the scheduling announcement signalling may be associated with a radio network identifier for the terminal device(s) to which the allocated resources are addressed. However, in general any scheme for communicating scheduling assignments in a D2D operating mode may be modified in accordance the principles described herein.

In the example represented in FIG. 6, the first (transmitting) terminal device 506 is configured to operate in a D2D mode to transmit data to the second (receiving) terminal device 508 on the first carrier, and this may be generally in accordance with previously proposed techniques for D2D operations, but the allocation of radio resources provided by control signalling transmitted in the control region 603 of the first carrier 601 is taken to apply also to the second carrier 602.

Thus, in subframe SF-A, the transmitting terminal device 506 transmits control signalling 606A comprising a scheduling announcement (side-link control signalling) indicating radio resources 608A in the user-plane region 604 of the subframe SF-A on which data is to be transmitted to the receiving terminal device 508. In this example it is assumed the control signalling 606A indicates three separate regions of radio resources 608A in the user-plane region 604. This allocation is schematically indicated by the arrows in the figure. However, it will be appreciated the specific radio resources (i.e. in terms of specific time and frequency resource blocks) indicated by the control signalling is not significant and may be based on established principles of scheduling D2D transmissions in a wireless telecommunications systems in a single-carrier context.

However unlike a conventional D2D operating mode, and as noted above, in accordance with the example represented in FIG. 6, both the transmitting terminal device 506 and the receiving terminal device 508 are configured to interpret the control signalling 606A as applying to both the user-plane region 604 of the first carrier 601 in subframe SF-A and the user-plane region 604 of the second carrier 602 in the subframe SF-A. Thus, the control signalling 606A sent on the first carrier provides an implicit indication of radio resources 610A in the user-plane region of the second carrier, as schematically indicated by the shaded blocks represented in FIG. 6. Thus, the transmitting terminal device 506 having transmitted the control signalling 606A to the receiving terminal device on the first carrier may then transmit user-plane data to the second terminal device using both the radio resources 608A on the first carrier 601 and the radio resources 610A on the second carrier 602. The transmission of data on the allocated radio resources may in itself be performed in any conventional D2D manner. Thus, the receiving terminal device having received the control signalling 606A on the first carrier may simply proceed to receive and decode the user-plane data in both the radio resources 608A on the first carrier and the radio resources 610A on the second carrier. A similar process occurs in subframes SF-B and SF-C. Thus in subframe SF-B control signalling 606B indicating radio resources 608B for communicating user-plane data on the first carrier also provides an indication of corresponding radio resources 610B for communicating user-plane data on the second carrier. Likewise, in subframe SF-C control signalling 606C indicating radio resources 608C for communicating user-plane data on the first carrier also provides an indication of radio resources 610C for communicating user-plane data on the second carrier.

Thus, in accordance with the approach represented in FIG. 6, the control signalling overhead associated with allocating radio resources on the first and second carriers is in effect halved.

In this particular example the transmitting and receiving terminal devices are configured to assume the same arrangement of resources in the corresponding subframes of the respective carriers. That is to say the pattern of radio resources 608A in subframe SF-A is the same as the pattern of radio resources 610A in subframe SF-A (i.e. the time and frequency resource blocks are at the same relative locations within each carrier). However, it will be appreciated that in other implementations the radio resources 610A on the second carrier indicated by the control signalling 606A on the first carrier need not be at the same relative locations as the radio resources 608A on the first carrier. For example, the first and second terminal devices may be configured to modify the radio resources indicated by the control signalling 606A when applied to the second carrier in accordance with a predefined scheme. For example, the terminal devices may be configured to assume the radio resources 610A on the second carrier are offset in time by a pre-defined amount relative to the radio resources 608A on the first carrier indicated by the control signalling 606A.

In this regard, the approach represented in FIG. 6 is one in which the indication of radio resources on the second carrier to be used for communicating user-plane data is provided implicitly by the control signalling 606A transmitted on the first carrier.

Configuration aspects of the approach represented in FIG. 6, such as the carriers to which the scheduling announcement signalling is applicable, may be established through prior signalling, for example system information signalling, or predefined in accordance with an operating standard of the wireless telecommunications system. In some cases the scheduling announcement signalling 606A may itself include an indication of whether or not the resource allocations are to be applied to other carriers, and if so which carriers. This provides the transmitting terminal device with a simple mechanism for in effect activating and deactivating the use of the second carrier on a subframe-by-subframe basis.

As noted above, the content of the data transmitted on the first and second carriers is not significant to the operating printable described herein. In some cases the data transmitted on the two carriers may be different, thereby providing increased throughput. In other cases the data transmitted on the two carriers may be the same such that the receiving terminal device can combine the received signalling to seek to improve reliability in respect of the communications. In certain implementations the control signalling may include an indication as to whether or not the data transmitted on the two carriers is the same or different in respect of a given subframe, or this may be configured semi-statically, for example through system information signalling.

Figure 7:
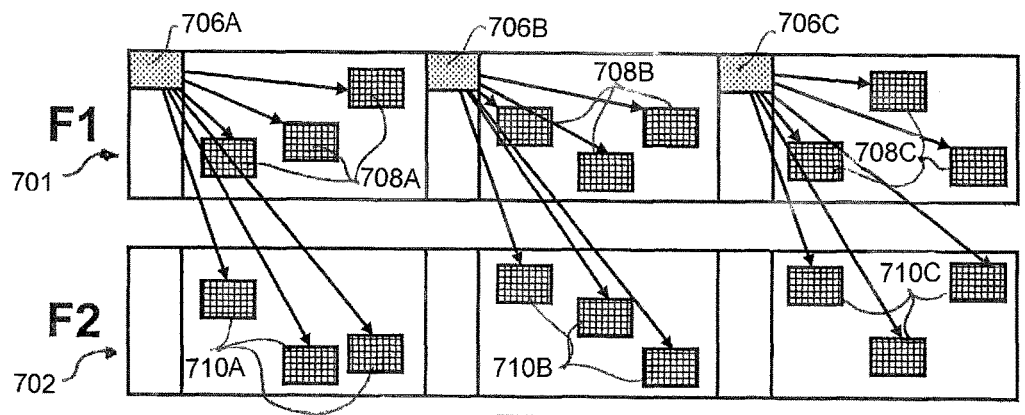

FIG. 7 schematically represents an arrangement of radio resources used to support D2D communications between the first terminal device 506 and the second terminal device 508 represented in FIG. 5 in accordance with another embodiment of the disclosure. FIG. 7 is generally similar to, and will be understood from, FIG. 6, and aspects of FIG. 7 which correspond directly with aspects of FIG. 6 discussed above are not described again in detail in the interest of brevity. The approach represented in FIG. 7 differs from the approach represented in FIG. 6 in that the control signalling on one carrier provides an explicit indication of radio resources to be used for user-plane data on another carrier (as opposed to providing an implicit indication as in the approach of FIG. 6).

Thus, in subframe SF-A represented in FIG. 7, the transmitting terminal device 506 transmits control signalling 706A on the first carrier 701 which comprises side-link control signalling indicating radio resources 708A in the user-plane region 604 of the subframe SF-A on the first carrier 701 and also radio resources 710A in the user-plane region 604 of the subframe SF-A on the second carrier 702. The radio resources 708A, 710A may then be used for transmitting user-plane data to the terminal device(s) to which the side-link control signalling is addressed. In this example it is assumed the control signalling 706A indicates three separate regions of radio resources 708A in the user-plane region 604 of the first carrier 701 and three separate control regions of radio resources 710A in the user-plane region 604 of the second carrier 702, as schematically indicated by the arrows in the figure. The manner in which the control signalling 706A indicates the radio resources 710A on the second carrier may broadly correspond with the manner in which control signalling might normally indicate allocated radio resources in a single-carrier D2D context, but with a modification to include an indication in association with each resource allocation to indicate the carrier to which the resource allocation applies, for example based on indexing.

Thus, in the approach of FIG. 7 the control signalling 706A sent on the first carrier provides an explicit indication of radio resources 710A in the user-plane region of the second carrier 702 in addition to an explicit indication of radio resources 708A in the user-claim region of the first carrier 701. The transmitting terminal device 506 having transmitted the control signalling 706A to the receiving terminal device 508 on the first carrier may then transmit user-plane data to the second terminal device using both the radio resources 708A on the first carrier 701 and the radio resources 710A on the second carrier 702. A similar process occurs in subframes SF-B and SF-C of FIG. 7. Thus in subframe SF-B control signalling 706B indicating radio resources 708B for communicating user-plane data on the first carrier 701 also provides an indication of radio resources 710B for communicating user-plane data on the second carrier 702. Likewise, in subframe SF-C control signalling 706C indicating radio resources 708C for communicating user-plane data on the first carrier also indicates radio resources 710C for communicating user-plane data on the second carrier.

Thus, the approach represented in FIG. 7 is broadly similar to the approach of FIG. 6, except the indication of radio resources on the second carrier to be used for communicating user-plane data is provided explicitly (as opposed to implicitly) in the control signalling 706A transmitted on the first carrier. This approach involves a modification to the control signalling format and also provides a slight increase in the overall amount of control signalling as compared to the approach of FIG. 6, but the approach of FIG. 7 can provide greater flexibility in how the radio resources are allocated for use by the first terminal device across the two carriers.

Figure 8:
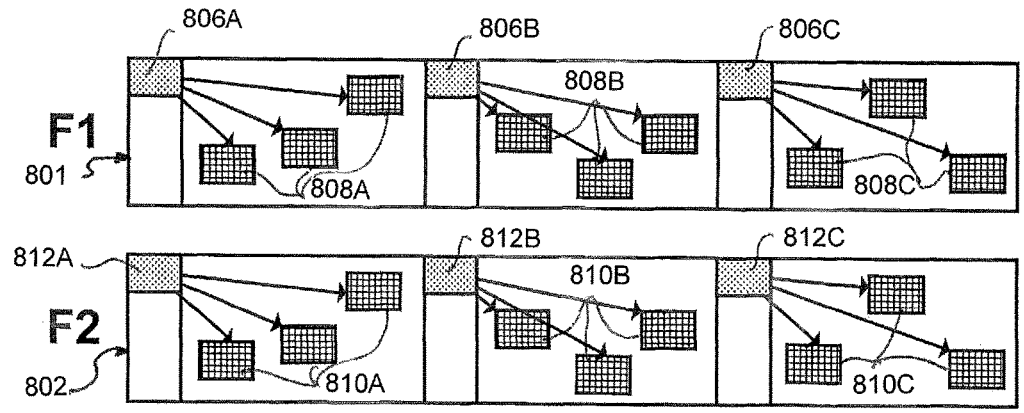

FIG. 8 schematically represents an arrangement of radio resources used to support D2D communications between the first terminal device 506 and the second terminal device 508 represented in FIG. 5 in accordance with another embodiment of the disclosure. FIG. 8 is generally similar to, and will be understood from, FIG. 6, and aspects of FIG. 8 which correspond directly with aspects of FIG. 6 discussed above are not described again in detail in the interest of brevity. However, the approach represented in FIG. 8 differs from the approach represented in FIG. 6 in that in addition to providing control signalling on the first carrier to indicate radio resources allocated for user-plane data on the second carrier, there is also provided control signalling on the second carrier to indicate radio resources allocated for user-plane data on the first carrier.

Thus, in subframe SF-A in FIG. 8, the transmitting terminal device 506 transmits control signalling 806A comprising side-link control signalling on the first carrier 801. The control signalling 806A on the first carrier 801 provides an explicit indication of radio resources 806A in subframe SF-A on the first carrier 801 and an implicit indication of radio resources 810A in subframe SF-A on the second carrier 802. In this regard the operation of the example embodiment represented in FIG. 8 in using control signalling on one carrier to provide an implicit indication of radio resources on another carrier may correspond with the operation described above with respect to FIG. 6.

However, in subframe SF-A in FIG. 8, the transmitting terminal device 506 also transmits control signalling 812A comprising side-link control signalling on the second carrier 802. The control signalling 812A on the second carrier 802 provides an explicit indication of radio resources 810A in subframe SF-A on the second carrier 802 and an implicit indication of radio resources 806A in subframe SF-A on the first carrier 801. In this regard the operation of the example embodiment represented in FIG. 8 corresponds with the operation described above with respect to FIG. 6 but with the carriers reversed.

A similar process occurs in subframes SF-B and SF-C of FIG. 8. Thus in subframe SF-B, control signalling 806B on the first carrier 801 and control signalling 812A on the second carrier 802 both indicate resources 808B, 810B on both the first and second carriers. Likewise, in subframe SF-C, control signalling 806C on the first carrier and control signalling 812C on the second carrier both indicate resources 808C, 810C on both the first and second carriers.

The advantage of this approach over the approach of FIG. 6 is the dual transmission of control signalling indicating radio resources on both carriers. This means that if a receiving terminal device fails to receive the control signalling on one of the carriers, it may nonetheless receive the control signalling on the other carrier, and from this determine the radio resources 808A, 810A for user-plane data on both carriers. This provides a level of redundancy in the control signalling transmissions. This may be useful, for example, where there is a concern the control signalling may not be received with a high degree of reliability. As with the other example embodiments described herein, the configuration of this operation may be established through system information or an indication that the control signalling applies to more than one carrier may be included with the control signalling itself. Furthermore, a receiving terminal device may combine the control signalling 806A, 812A received on the first and second carriers to help improve the likelihood of successful receipt.

Although FIG. 8 is presented in the context of a modified version of the approach of FIG. 6 in which the indication of an allocation of radio resources on one carrier is implicitly provided by control signalling on another carrier, a similar modification can be applied to the approach of FIG. 7. That is to say, for an approach in which control signalling on one carrier provides an explicit indication of radio resource allocations on multiple carriers, more than one of the multiple carriers may in some implementations include control signalling providing explicit indications of the radio resource allocations on the different carriers.

Figure 9:
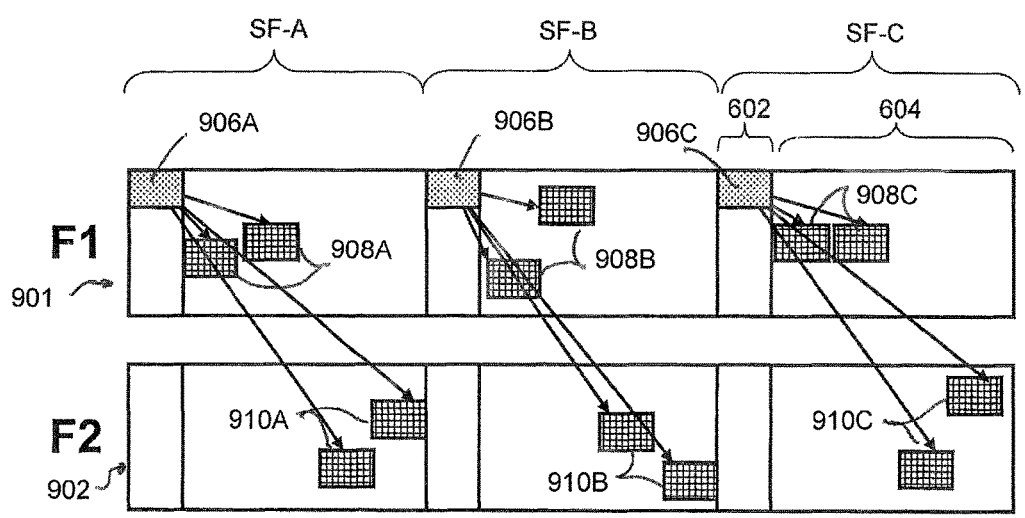

FIG. 9 schematically represents an arrangement of radio resources used to support D2D communications between the first terminal device 506 and the second terminal device 508 represented in FIG. 5 in accordance with another embodiment of the disclosure. FIG. 9 is generally similar to, and will be understood from, FIG. 7. However, the approach represented in FIG. 9 differs from the approach represented in FIG. 7 in that the radio resources allocated for user-plane data transmissions on the two carriers are time-multiplexed. That is to say, the transmitting terminal device is arranged to schedule the user-plane transmissions on the two carriers for non-overlapping times. This may be appropriate, for example, in a situation in which a receiving terminal device is unable to receive signalling on multiple carriers at the same time. Although this approach does not in itself provide for greater throughput, it provides greater scheduling flexibility. For example, it allows the transmitting terminal device to select from among a wider range of radio resources for transmitting user-plane data whilst the receiving terminal device need only monitor for control signalling on one carrier. It will be appreciated in some cases there may be further restrictions applied with regards to the timings of the radio resource allocations for user-plane data according to the operating capabilities of the terminal devices. For example, as well as not overlapping in time, the radio resources on the two carriers may be separated in time by an amount sufficient to allow the receiving terminal device (and/or the transmitting terminal device) time to retune its transceiver appropriately.

A similar process occurs in subframes SF-B and SF-C of FIG. 9. Thus in subframe SF-B control signalling 906B indicating radio resources 908B for communicating user-plane data on the first carrier 901 also provides an indication of radio resources 910B for communicating user-plane data on the second carrier 902 for different times. Likewise, in subframe SF-C control signalling 906C indicating radio resources 908C for communicating user-plane data on the first carrier also indicates non-overlapping radio resources 910C for communicating user-plane data on the second carrier.

Figure 10:
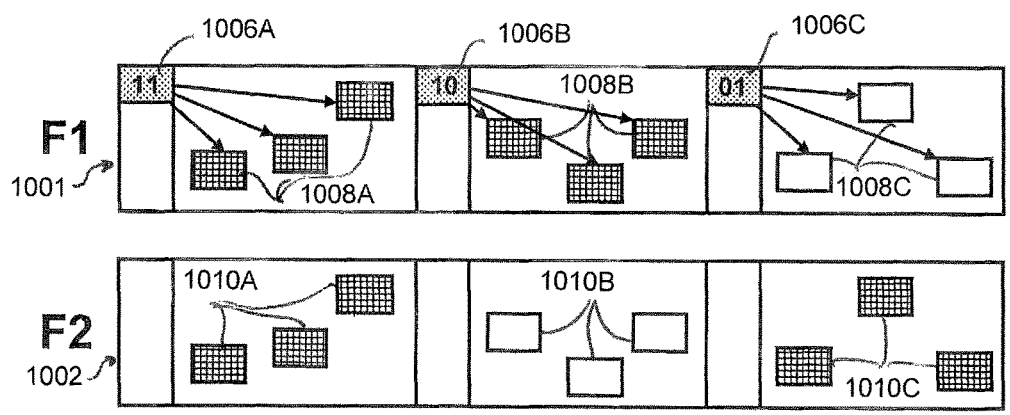

FIG. 10 schematically represents an arrangement of radio resources used to support D2D communications between the first terminal device 506 and the second terminal device 508 represented in FIG. 5 in accordance with another embodiment of the disclosure. FIG. 10 is generally similar to, and will be understood from, FIG. 6, and aspects of FIG. 10 which correspond directly with aspects of FIG. 6 discussed above are not described again in detail in the interest of brevity. In the approach of FIG. 6 the indication of radio resources on the second carrier 602 provided by the control signalling 606 transmitted on the first carrier 602 is considered to apply for all subframes. However, in the approach of FIG. 10, control signalling transmitted on one carrier is associated with an indication of which carrier(s) the control signalling applies for, in this example on a subframe-by-subframe basis. This indication may, for example, be referred to as a carrier-active indicator. The carrier-active indicator may comprise a simple binary indicator in the side-link control signalling for each of the carriers to which the control signalling could potentially apply.

In the example of FIG. 10 there are two carriers 1001, 1002, and so a two-bit carrier-active indicator may be used, for example with a first digit referring to the first carrier 1001 and a second digit referring to the second carrier. For each digit of the carrier-active indicator a value of "0" may be taken to indicate the associated control signalling does not apply for that carrier (carrier inactive for that subframe) whereas a value of "1" may be taken to indicate the associated control signalling does apply for that carrier (carrier active for that subframe).

Thus, in subframe SF-A in FIG. 10, the transmitting terminal device 506 transmits control signalling 1006A comprising side-link control signalling on the first carrier 1001. The control signalling 1006A on the first carrier 1001 identifies radio resources 1006A in subframe SF-A on the first carrier 1001 and also radio resources 1010A in subframe SF-A on the second carrier 1002 as in the manner described above for the approach of FIG. 6. However, the control signalling 1006A in FIG. 10 is associated with an indication as to whether or not the identified radio resources are to be used for each of the carriers 1001, 1002. As mentioned above, this carrier-active indicator may be provided as a simple binary indicator for each carrier and example values for the carrier-active indicator are shown in association with the control signalling represented in FIG. 10 for each subframe. The indication may be provided, for example, as a new information element in the control signalling 1006A.

Thus, in subframe SF-A the carrier-active indicator value of "11" indicates the radio resources identified on the first and second carriers by control signalling 1006A are both being used for that subframe. Thus, the transmitting terminal device proceeds to transmit user-plane data in the radio resources 1008A on the first carrier 1001 and the radio resources 1010A on the second carrier 1002 and the receiving terminal device seeks to receive these transmissions.

However, in subframe SF-B the carrier-active indicator value of "10" in control signalling 1006B indicates the identified radio resources are only being used on the first carrier 1001 for this subframe. Thus, the transmitting terminal device transmits user-plane data in the radio resources 1008B on the first carrier 1001 but does not transmit any data on the radio resources 1010B on the second carrier 1002 in subframe SF-B.

In subframe SF-C the carrier-active indicator value of "01" in control signalling 1006C indicates the identified radio resources are only being used on the second carrier 1002 for the subframe.

Thus, the transmitting terminal device transmits user-plane data on the radio resources 1010C on the second carrier 1002 but does not transmit any data on the radio resources 1008C on the first carrier 1001 in subframe SF-C.

Thus the approach of FIG. 10 provides for further flexibility over the approach of FIG. 6 in that the transmitting terminal device can decide (and indicate to the receiving terminal device(s)) on a subframe-by-subframe basis whether transmissions on multiple carriers are being used for that subframe, and if so, which of the available carriers are to be used.

Thus, the approaches described above with reference to FIGS. 6 to 10 provide mechanisms for flexibly using multiple carriers in a device-to-device communication mode by providing indications of radio resources on one carrier in control signalling transmitted on another carrier.

Figure 11:
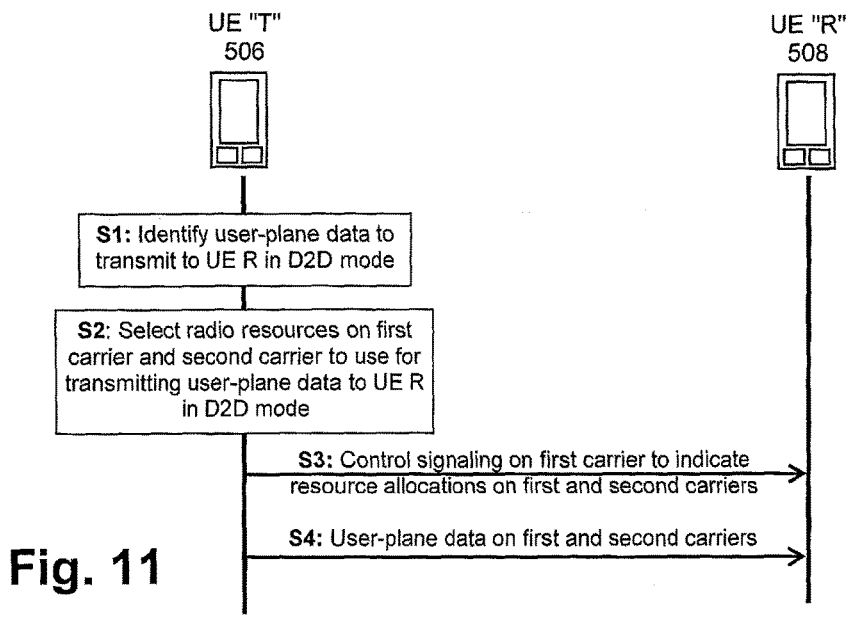
FIG. 11 is a ladder diagrams schematically representing methods of operation in accordance with certain embodiments of the disclosure.

FIG. 11 is a ladder diagram schematically representing signalling exchange between the terminal devices 506, 508 schematically represented in FIG. 5 in accordance with certain embodiments of the disclosure such as discussed above, for example with reference to FIGS. 6 to 10. It is assumed here the terminal devices 506, 508 are exchanging D2D communications, with the terminal device 506 transmitting and the terminal device 508 receiving. In this regard the terminal device 506 may be referred to as the transmitting terminal device (UE "T") while the terminal device 508 may be referred to as the receiving terminal device (UE "R").

In Step S1 the transmitting terminal device 506 identifies that there is (or will be) user-plane to transmit to the receiving terminal device in a D2D communication mode. The reason why the data is to be transmitted from the transmitting terminal device to the receiving terminal device is not significant. For example, it may be that the first and second terminal devices are operating in a walkie-talkie device-to-device communication mode, and the user of the first terminal device has pressed a "transmit" button.

In Step S2 the transmitting terminal device 506 selects radio resources on the first and second carriers (and possibly others if there are more than two carriers that may be used) to use for transmitting the user plane data that is to be transmitted. The transmitting terminal device may select these resources taking account of conventional principles for scheduling data transmissions, bearing in mind the availability of radio resources on multiple carriers in accordance with embodiments of the disclosure.

In Step S3 the transmitting terminal device 506 transmit control signalling (scheduling announcement signalling/side-link control signalling) to the receiving terminal device 508. This signalling provide an indication of the radio resources on the first and second carriers selected for transmitting the user-plane data. In terms of signalling protocols, this control signalling may be communicated generally in accordance with conventional techniques for exchanging control information in a device-to-device communication mode.

In Step S4 the transmitting terminal device proceeds to transmit the user plane data on the scheduled resources on the first and second carriers and the data are received by the receiving terminal device. In terms of signalling protocols, these communications may be performed generally in accordance conventional techniques for exchanging data in a device-to-device communication mode, albeit using resources from multiple carriers in accordance with embodiments of the disclosure.

As noted above, in particular with reference to FIGS. 6 to 11, certain embodiments of the disclosure help to support multiple-carrier operation in a D2D context by providing control signalling on one carrier which indicates radio resources to be used for communicating data on another carrier. However, in addition to this, or separately and independently from this, there are approaches in accordance with other embodiments of the disclosure which help to support multiple-carrier operation in a D2D context in other ways.

For example, certain other embodiments of the disclosure propose an arrangement in which a first terminal device may transmit data to a second terminal device in a device-todevice communication mode in a wireless telecommunications system supporting communications on a first carrier operating over a first frequency band (F1) and a second carrier operating over a second frequency band (F2). In such a scenario, the first terminal device may be communicating with the second terminal device on the first carrier in a device-to-device communication mode, but may determine that it would be more appropriate to switch these communications to the second carrier, for example because of changes in resource availability. Therefore, the transmitting terminal device may transmit control signalling on the first carrier that is addressed to the second terminal device and which comprises an indication that the first terminal device intends to transmit data to the second terminal device in a device-to-device communication mode on the second carrier following a carrier switch-over time. The first terminal device may then proceed with communicating with the second terminal device on the second carrier after the carrier switch-over time. In this regard to the indication may be referred to as a carrier switch indication. The carrier switch indication may in some cases be conveyed in association with control signalling comprising scheduling assignment information for the first carrier.

This approach to supporting multicarrier D2D operation can be advantageous in providing a ready mechanism for a transmitting terminal device to switch operation from one carrier to another carrier, for example in response to changing traffic conditions. In some implementations one carrier may in effect be considered a "default" carrier which terminal device(s) that might receive device-to-device communications routinely monitor. Then, if there is device-to-device user-plane data to be communicated to a receiving terminal device, the receiving terminal device may be directed to switch to another carrier on which the user-plane data is transmitted. In principle the first carrier might not be used for communicating any user-plane data in a device-to-device operating mode, but may only be used for indicating to terminal devices when they needs to switch to another carrier to receive D2D user-plane data. This approach might be adopted, for example, in a scenario in which a wireless telecommunications system provides a first carrier primarily for conventional communications between a base station and a terminal device and a second carrier primarily for device-to-device communications. For example, a dedicated device-to-device carrier may be provided to ensure high reliability and good availability in respect of device-to device communications when they are needed, for example in an emergency/public safety context. Thus, the receiving terminal device(s) need only monitor for control signalling on the first carrier that they may already be monitoring for conventional communications from the base station to identify when there is a need to switch to the second carrier to receive device-to-device communications.

Thus, in accordance with certain embodiments of the disclosure, D2D control signalling transmitted on one carrier may provide an indication that a receiving terminal device should switch to another carrier to receive further D2D data.

Figure 12:
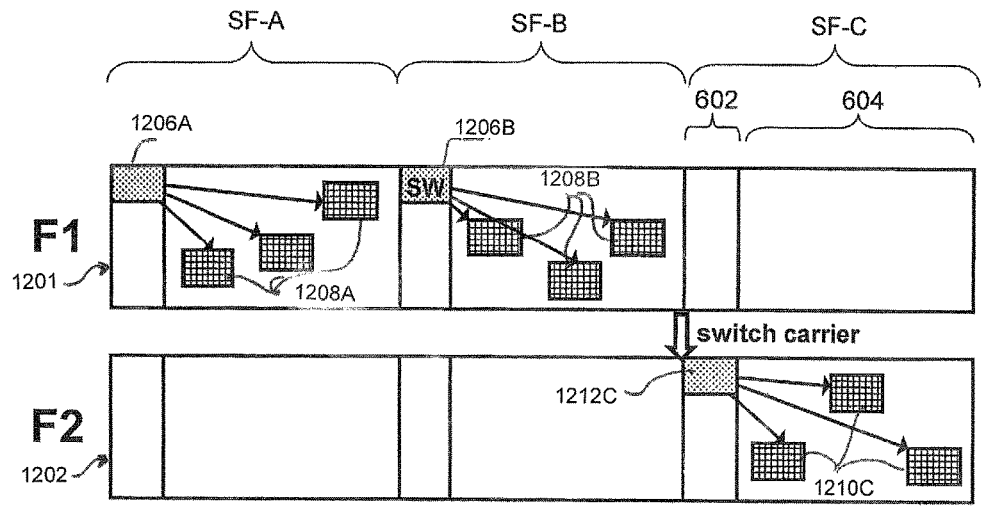
FIG. 12 schematically represents radio resources used for communicating user-plane data from a first terminal device to a second terminal device and associated resource allocation signalling on first and second carriers in accordance with certain embodiments of the disclosure.

FIG. 12 schematically represents an arrangement of radio resources used to support D2D communications between the first terminal device 506 and the second terminal device 508 represented in FIG. 5 in accordance with an embodiment of the disclosure. In this example it is assumed the first terminal device 506 transmits data to the second terminal device 508 in a D2D operating mode using two logical carriers 1201, 1202. In this regard it will be appreciated the contents of the data and the reason why the first terminal device is transmitting the data to the second terminal device in the D2D operating mode are not significant to the principles underlying the operating principles described herein. It will further be appreciated that in some implementations the first terminal device may be involved in transmitting the relevant-data in a broadcast mode. That is to say, the data may be transmitted from the first terminal device to a plurality of other terminal devices, of which the second terminal device represented in FIG. 5 is only one.

Thus the radio resources are provided by a first logical carrier 1201 (uppermost in FIG. 12) operating over a first frequency band F1 and a second logical carrier 1202 (lowermost in FIG. 12) operating over a second frequency band F2. Each carrier in FIG. 12 comprises an arrangement of radio resource blocks arranged in time (horizontal direction in the figure) and frequency (vertical direction in the figure). The specific radio resources comprising the respective carriers (e.g. in terms of absolute frequencies) may be established in accordance with conventional multicarrier techniques in wireless telecommunications systems, for example based on which frequencies are available for use by the operator of the wireless telecommunications system and how the operator of the wireless telecommunications system has chosen to deploy the network on these frequencies to support D2D operations.

In this example it is assumed the D2D communication mode employs a radio frame structure which broadly corresponds with an LTE-type downlink radio frame structure (e.g. of the kind represented in FIG. 2B). Accordingly, each of the first and second carriers support a D2D radio interface having a radio frame structure comprising a plurality of radio subframes. For each carrier represented in FIG. 12, three subframes are shown, these are labelled in FIG. 12 as SF-A, SF-B and SF-C. It will be appreciated there will in general be more radio subframes to the left and right of those represented in the figure. In this example the subframes on each carrier are synchronised in time. That is to say, subframe SF-A on the first carrier 1201 and corresponding subframe SF-A on the second carrier 1202 are at the same times, and likewise for the SF-B and SF-C. In this example each subframe comprises a control region 603 and a user-plane region 604, and in terms of their functionality, these regions 603, 604 may respectively correspond with PDCCH and PDSCH regions in a conventional LTE downlink subframe. The transmitting terminal device 506 may thus transmit resource allocation signalling in the control region 603 of a subframe to provide an indication of radio resources in the user-plane data region 604 which are to be used for transmitting data to the receiving terminal device 508 addressed by the resource allocation signalling. In this regard the signalling protocols used by the transmitting terminal device 506 for allocating radio resources to the receiving terminal device 508 may be generally based on the same protocols as resource allocation signalling used by a base stations for conventional LTE downlink communications unless modified to support embodiments of the present disclosure as described herein. For example, the scheduling announcement signalling may be associated with a radio network identifier for the terminal device(s) to which the allocated resources are addressed. However, in general any scheme for communicating scheduling assignments in a D2D operating mode may be modified in accordance the principles described herein.

In the example represented in FIG. 12, the first (transmitting) terminal device 506 is configured to operate in a D2D mode to transmit data to the second (receiving) terminal device 508 on the first carrier, and this may be generally in accordance with previously proposed techniques for D2D operations, but the transmitting terminal device 506 is also configured to provide an indication to the second terminal device that it should seek to receive transmissions from the first terminal device on the second carrier following a carrier switch-over time. In the example represented in FIG. 12 it will be assumed the transmitting terminal device communicates with the receiving terminal device on the first carrier 1201 in subframes SF-A and SF-B, but has determined that in subframe SF-C, it should instead communicate with the second terminal device on the second carrier 1202. That is to say, the carrier switch-over time in this example is between subframes SF-B and SF-C. The specific reason why the transmitting terminal device determines that it should switch to communicating with the second terminal device in a device-to-device mode on the second carrier starting from subframe SF-C is not significant. For example, it may be that the transmitting terminal device has recognised a change in traffic conditions, for example relating to congestion or interference, on the carriers means that its communications would be more suitably made on the second carrier, or because a certain carrier may be prioritised for certain communications.

From the perspective of a terminal device, carrier switching may be important in some situations because of issues relating to terminal device capability/complexity. For example, carrier switching may be particularly suitable for situations in which a transmitting or receiving terminal device does not have dual RF carrier/baseband capability.

In terms of a transmitter side terminal device, two transmitter modules (i.e. two power amplifier/separate RF transceiver functions) would allow the terminal device to support simultaneous multi-carrier D2D transmissions. However, there can be significant cost and complexity issues in providing two transmitter (Tx) modules. In accordance with the principles described herein, a transmitting terminal device having one transmitter module may switch between carriers to in effect operate as a multi-carrier device taking in to account the switching time (without simultaneous operation on both carriers).

In terms of a receiver side terminal device, the D2D receiver may have two receivers, one is for out-of-coverage scenarios and the other is for in-coverage scenarios. That is to say, a terminal device may have one Tx/Rx transceiver for an in-coverage carrier and another Tx/Rx transceiver for an out-of-coverage carrier—i.e. a total two Tx/Rx transceivers. The resource allocations for the in-coverage situation are under base station control. If the base station schedules side-link control signalling resources in both first carrier of out-of-coverage and the second carrier of out-of-coverage, the terminal device may temporarily switch its in-coverage receiver to support a second out-of coverage carrier. After transmitting/receiving data in the out-of-coverage second carrier, the terminal device may switch back to the in-coverage carrier.

Scheduling decisions may take account of the terminal devices' capability regarding dual Tx/RX and select appropriate scheduling to allow time for carrier switching.

Thus, in subframe SF-A, the transmitting terminal device 506 transmits control signalling 1206A comprising a scheduling announcement (side-link control signalling) indicating radio resources 1208A in the user-plane region 604 of the subframe SF-A on which data is to be transmitted to the receiving terminal device 508. In this example it is assumed the control signalling 1206A indicates three separate regions of radio resources 1208A in the user-plane region 604. This allocation is schematically indicated by the arrows in the figure. However, it will be appreciated the specific radio resources (i.e. in terms of specific time and frequency resource blocks) indicated by the control signalling is not significant and may be based on established principles of scheduling D2D transmissions in a wireless telecommunications systems in a single-carrier context. This aspect of the operation may be conventional.

In accordance with this example implementation, it is assumed that during subframe SF-A the transmitting terminal device recognises that it would be appropriate to switch its device-to-device transmissions to the second terminal device to the second carrier. As already mentioned, the specific reason why this is determined to be appropriate is not significant to the principles underlying approaches in accordance with embodiments of the disclosure.

Thus, in subframe SF-B, the transmitting terminal device 506 transmits to the receiving terminal device on the first carrier 1201 control signalling 1206B which contains an indication SW that the transmitting terminal device intends to switch its transmissions to the second carrier from a carrier switch-over time. In this example implementations the carrier switch-over time is assumed to be the start of the subframe following that in which the carrier switch indication SW is communicated. In some examples the carrier switch-over time may be delayed by one or more further subframes, for example to allow time for the transmitting and all receiving terminal device to retune/reconfigure their transceiver circuitry. For example, the transmitting terminal device may be configured not to make transmissions on the second carrier until at least a certain time has elapsed after the end of the subcarrier in which the carrier switch indicator was transmitted.

The carrier switch indication SW may, for example, comprise a simple binary indicator in what might otherwise be conventional control signalling (if there are multiple potential carriers to switch to, the indicator may indicate which carrier to switch to). Thus the control signalling 1206B may comprise a carrier switch indication and information corresponding to a conventional scheduling announcement indicating radio resources 1208B in the user-plane region 604 of the subframe SF-B on which data is to be transmitted to the receiving terminal device 508. That is to say, the transmitting terminal device may continue to transmit data to the receiving terminal device on the first carrier in the subframe in which the indication that a carrier switch is to be made is transmitted. In principle, in some implementations the presence of the switch indicator SW in the control region 602 of subframe SF-B may be taken to indicate the carrier switchover should happen immediately whereby any resource allocations associated with the control signalling received on the first carrier in the subframe containing he switch indication should be taken to apply to the second carrier.

Thus, having transmitted the indication of the carrier switch to the second terminal device in subframe SF-B, in subframe SF-C, the transmitting terminal device 506 transmits on the second carrier 1202 control signalling 1212C comprising a scheduling announcement (side-link control signalling) indicating radio resources 1210C in the user-plane region 604 of the subframe SF-C on which data is to be transmitted to the receiving terminal device 508 on the second carrier. In this example it is again assumed the control signalling 1212C indicates three separate regions of radio resources 1210C in the user-plane region 604, as schematically indicated by the arrows in the figure. However, it will again be appreciated the specific radio resources (i.e. in terms of specific time and frequency resource blocks) indicated by the control signalling is not significant and may be based on established principles of scheduling D2D transmissions in a wireless telecommunications systems in a single-carrier context. This aspect of the operation may again be conventional.

Thus, in accordance with the approach represented in FIG. 12, control signalling associated with D2D communications on one carrier may be used to provide an indication that at least some future D2D communications are to be made using radio resources associated with another carrier.

In addition to providing a carrier switch indication, the control signalling may also convey an indication of the carrier switch-over time after which communications are to be made on the second carrier. The indication of the carrier switch-over time may be provided implicitly, e.g. it may be determined from a time associated with when the control signalling is transmitted. For example, the carrier switch-over time may be taken to correspond with the time of the control signalling (to an appropriate degree of temporal resolution, for example with a subframe resolution). This corresponds with the approach represented in FIG. 12 in which the switch-over time is at the end of the subframe in which the control signalling is transmitted. However, in other examples there may be a greater delay, for example the switch-over time may be the beginning of a subframe that is a predefined subframes after the one in which the control signalling is transmitted. Alternatively, the control signalling itself may indicate the switch-over time. For example the control signalling may explicitly provide an indication of a subframe in which the carrier switch-over is to be made (e.g. by providing an indication of a specific subframe, such as a system frame number, or a number of subframes to wait after receiving the control signalling before switching carrier). It will be appreciated that timings need not be based on subframes, but there may be other defined periods, for example windows comprising multiple subframes. The windows may correspond with repeat periods for control signalling for D2D communications in an implementation in which D2D communications may not be available in every subframe. That is to say, the control signalling in some implementations may be repeated on the basis of control signalling time windows defined in accordance with a control signalling schedule for the D2D communications associated with the terminal device rather than on a subframe-by-subframe basis.

Following the switch from D2D operations on the first carrier to D2D operations on the second carrier as represented in FIG. 12, there may subsequently be a switch back from D2D operations on the second carrier to D2D operations on the first carrier. This switch back may occur in the same manner as described above, except that the switch indicator will be transmitted in control signalling on the second carrier. Conversely, the terminal devices may be configured to switch back automatically after a predetermined carrier switch-back time.

Such a carrier switch-back time may be based on the characteristics of the transmission of data on the second carrier. For example, the transmitting and receiving terminal devices may be configured to automatically switch back to operating on the first carrier (i.e. with the second terminal device monitoring for control signalling on the first carrier) if there has been no transmission of data on the second carrier for a predefined amount of time.

In some cases an indication of a carrier switch-back time may be provided in association with the control signalling which initiated the carrier switch. For example, referring to FIG. 12, the control signalling 12068 may further comprise an indication of a carrier switch back time after which operations which is back from the second carrier 1202 to the first carrier 1201. The indication of the carrier switch-back time may be provided implicitly, e.g. it may be determined from a time associated with when the control signalling is transmitted. For example, the carrier switch-back time may be taken to correspond with a fixed time after the control signalling 12068 that initiated the carrier switch (with an appropriate degree of temporal resolution, for example with a subframe resolution). Alternatively, the control signalling itself may explicitly indicate a switch-back time. For example the control signalling may provide an indication of a specific subframe in which the carrier switch-back is to be made (e.g. by providing an indication of a corresponding system frame number or a number of subframes for which to operate on the second carrier before switching back to the first carrier). It will again be appreciated that timings need not be based on subframe periods, but may more generally be based on numbers of control signalling time windows defined in accordance with control signalling scheduling for the D2D communications.

Figure 13:
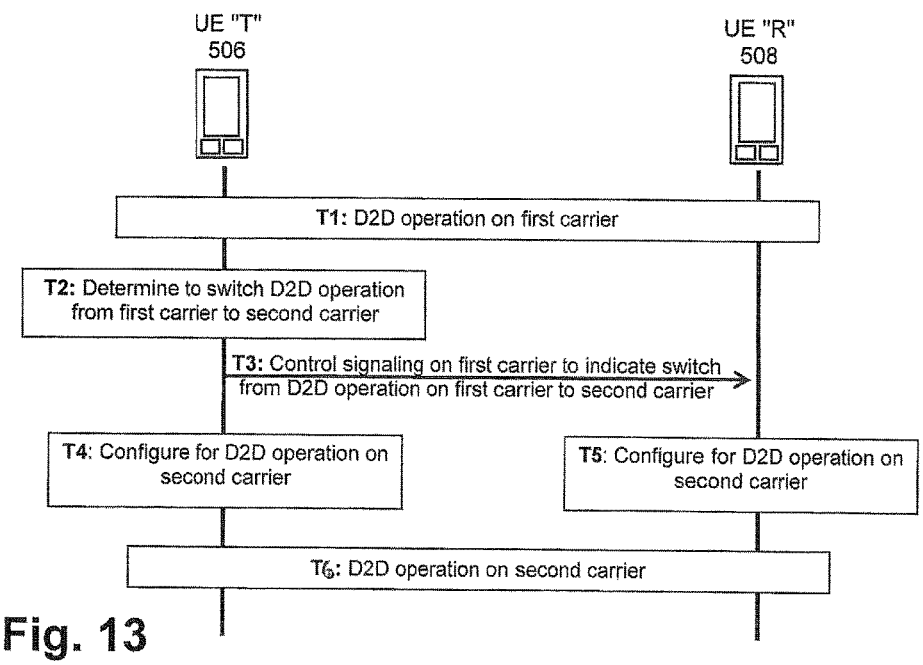
FIG. 13 is a ladder diagrams schematically representing methods of operation in accordance with certain embodiments of the disclosure.

FIG. 13 is a ladder diagram schematically representing signalling exchange between the terminal devices 506, 508 schematically represented in FIG. 5 in accordance with certain embodiments of the disclosure such as discussed above with reference to FIG. 12. As before, it is assumed here the terminal devices 506, 508 are exchanging D2D communications, with the terminal device 506 transmitting and the terminal device 508 receiving. In this regard the terminal device 506 may be referred to as the transmitting terminal device (UE "T") while the terminal device 508 may be referred to as the receiving terminal device (UE "R").

In Step T1 the first terminal device 506 and the second terminal device 508 are communicating in a D2D operating mode on the first carrier. The principles underlying this operating mode may be based on any known scheme for D2D operations.

In Step T2 the first terminal device determines that it would be appropriate to switch the ongoing D2D operation represented Step T1 from the first carrier to the second carrier. This may be, for example, because there is a change in traffic conditions meaning the first carrier has become more congested than the second carrier. However, the specific reason why the first terminal device determines that it should switch operations to the second carrier is not significant.

In Step T3 the transmitting terminal device transmits control signalling (scheduling announcement signalling/ side-link control signalling) to the receiving terminal device 508 which includes an indication that its D2D transmissions to the second terminal device are to switch from the first carrier to the second carrier. In terms of signalling protocols, this control signalling may be communicated generally in accordance with conventional techniques for exchanging control information in a device-to-device communication mode.

As schematically indicated in steps T4 and T5, the transmitting and receiving terminal devices configure their respective transceivers for D2D operation on the second carrier.

In Step T6 the first terminal device 506 and the second terminal device 508 proceed by communicating in a D2D operating mode on the second carrier, thus completing the switch in operation from the first carrier to the second carrier.

Although the above-described examples have primarily focused on a multicarrier implementation in which there are two carriers. It will be appreciated that in other implementations that may be more than two carriers. For example, the side-link control signalling on one carrier may be used to allocate resources for higher-layer data (user-plane data) on two or more other carriers.

Whilst in the above-described embodiments it is assumed the terminal devices undertaking D2D communications are also able to communicate with other terminal devices via a base station in a conventional non-D2D manner, it will be appreciated that in principle a terminal device according to an embodiment of the disclosure could be a dedicated D2D device that did undertake communications with other terminal devices through a base station.

Although the above-described examples have focused on implementations in the context of an LTE-based wireless telecommunications system, it will be appreciated similar principles can be adopted for in wireless telecommunications systems operating in accordance with other protocols.

Thus there has been described a method of operating first and second terminal devices for transmitting data in a device-to-device communication mode in a wireless telecommunications system supporting communications on a first carrier operating over a first frequency band and a second carrier operating over a second frequency band. The first terminal device transmits control signalling on the first carrier and this is received by the second terminal device. The control signalling comprises an indication of an allocation of radio resource blocks on the second carrier to be used for transmitting user-plane data from the first terminal device to the second terminal device. The first terminal device then proceeds to transmit the user-plane data to the second terminal device on the second carrier using the radio resource blocks on the second carrier identified by the control signalling. The control signalling may also provide an indication of an allocation of radio resource blocks on the first carrier to be used for transmitting user-plane data to the second terminal device.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following two groups of numbered paragraphs:

First Group of Numbered Paragraphs

Paragraph 1. A method of operating a first terminal device for transmitting data to a second terminal device in a device-to-device communication mode in a wireless telecommunications system supporting communications on a first carrier operating over a first frequency band and a second carrier operating over a second frequency band; the method comprising:

transmitting on the first carrier control signalling comprising an indication of radio resources on the second carrier to be used for transmitting user-plane data from the first terminal device to the second terminal device; and transmitting user-plane data to the second terminal device on the second carrier using the radio resources on the second carrier indicated by the control signalling.

Paragraph 2. The method of paragraph 1, wherein the control signalling further comprises an indication of radio resources on the first carrier to be used for transmitting user-plane data from the first terminal device to the second terminal device, and wherein the method further comprises transmitting user-plane data to the second terminal device on the first carrier using the radio resources on the first carrier indicated by the control signalling.

Paragraph 3. The method of paragraph 2, wherein the indication of radio resources on the second carrier and the indication of radio resources on the first carrier are provided by a common indication that is applicable to both carriers.

Paragraph 4. The method of paragraph 2 or 3, wherein the each of the first and second carriers operate over a radio interface having a radio frame structure comprising a plurality of radio subframes, and wherein control signalling in each radio subframe of the first carrier comprises an indication of whether the control signalling is providing:
(i) an indication of radio resources on the first carrier to be used for transmitting user-plane data from the first terminal device to the second terminal device; or
(ii) an indication of radio resources on the second carrier to be used for transmitting user-plane data from the first terminal device to the second terminal device; or
(iii) an indication of radio resources on both the first and second carriers to be used for transmitting user-plane data from the first terminal device to the second terminal device.

Paragraph 5. The method of any of paragraphs 2 to 4, wherein the indication of radio resources on the second carrier and the indication of radio resources on the first carrier are provided as separate indications.

Paragraph 6. The method of any of paragraphs 2 to 5, wherein each of the first and second carriers operate over a radio interface having a radio frame structure comprising a plurality of radio subframes comprising radio resource blocks arranged in time and frequency, and wherein the indication of radio resources for transmitting user-plane data on the first carrier corresponds with a first radio resource block arrangement within a subframe of the first carrier and the indication of radio resources for transmitting user-plane data on the second carrier corresponds with a second radio resource block arrangement within a subframe of the second carrier.

Paragraph 7. The method of paragraph 6, wherein the first radio resource block arrangement is the same as the second radio resource block arrangement.

Paragraph 8. The method of paragraph 6, wherein the first radio resource block arrangement is not the same as the second radio resource block arrangement.

Paragraph 9. The method of paragraph 8, further comprising deriving one of the first and second radio resource block arrangements from the other of the first and second radio resource block arrangements based on a predefined relationship between them.

Paragraph 10. The method of any of paragraphs 2 to 9, wherein the user-plane data transmitted to the second terminal device on the second carrier is the same as the user-plane data transmitted to the second terminal device on the first carrier.

Paragraph 11. The method of any of paragraphs 2 to 10, wherein the user-plane data transmitted to the second terminal device on the second carrier is not the same as the user-plane data transmitted to the second terminal device on the first carrier.

Paragraph 12. The method of any of paragraphs 2 to 11, wherein the control signalling further comprises an indication of whether or not the user-plane data transmitted to the second terminal device on the second carrier is the same as the user-plane data transmitted to the second terminal device on the first carrier.

Paragraph 13. The method of any of paragraphs 2 to 12, wherein the radio resources on the second carrier indicated by the control signalling are for times which are different from the times of the radio resources on the first carrier indicated by the control signalling.

Paragraph 14. The method of any of paragraphs 1 to 13, further comprising transmitting on the second carrier control signalling comprising an indication of the radio resources on the second carrier to be used for transmitting user-plane data from the first terminal device to the second terminal device.

Paragraph 15. A first terminal device for transmitting data to a second terminal device in a device-to-device communication mode in a wireless telecommunications system supporting communications on a first carrier operating over a first frequency band and a second carrier operating over a second frequency band, wherein the first terminal device comprises a controller unit and a transceiver unit configured to operate together to
 transmit on the first carrier control signalling comprising an indication of radio resources on the second carrier to be used for transmitting user-plane data from the first terminal device to the second terminal device; and
 transmit user-plane data to the second terminal device on the second carrier using the radio resources on the second carrier indicated by the control signalling.

Paragraph 16. Circuitry for a first terminal device for transmitting data to a second terminal device in a device-to-device communication mode in a wireless telecommunications system supporting communications on a first carrier operating over a first frequency band and a second carrier operating over a second frequency band, wherein the circuitry comprises a controller element and a transceiver element configured to operate together to cause the first terminal device to:
 transmit on the first carrier control signalling comprising an indication of radio resources on the second carrier to be used for transmitting user-plane data from the first terminal device to the second terminal device; and
 transmit user-plane data to the second terminal device on the second carrier using the radio resources on the second carrier indicated by the control signalling.

Paragraph 17. A method of operating a second terminal device for receiving data from a first terminal device in a device-to-device communication mode in a wireless telecommunications system supporting communications on a first carrier operating over a first frequency band and a second carrier operating over a second frequency band; the method comprising:
 receiving on the first carrier control signalling comprising an indication of radio resources on the second carrier to be used by the first terminal device for transmitting user-plane data to the second terminal device; and
 receiving user-plane data from the first terminal device on the second carrier using the radio resources on the second carrier indicated by the control signalling.

Paragraph 18. The method of paragraph 17, wherein the control signalling further comprises an indication of radio resources on the first carrier to be used by the first terminal device for transmitting user-plane data to the second terminal device, and wherein the method further comprises receiving user-plane data from the first terminal device on the first carrier using the radio resources on the first carrier indicated by the control signalling.

Paragraph 19. The method of paragraph 18, wherein the indication of radio resources on the second carrier and the indication of radio resources on the first carrier are provided by a common indication that is applicable to both carriers.

Paragraph 20. The method of paragraph 18 or 19, wherein the each of the first and second carriers operate over a radio interface having a radio frame structure comprising a plurality of radio subframes, and wherein control signalling in each radio subframe of the first carrier comprises an indication of whether the control signalling is providing:
 (i) an indication of radio resources on the first carrier to be used for transmitting user-plane data from the first terminal device to the second terminal device; or
 (ii) an indication of radio resources on the second carrier to be used for transmitting user-plane data from the first terminal device to the second terminal device; or
 (iii) an indication of radio resources on both the first and second carriers to be used for transmitting user-plane data from the first terminal device to the second terminal device.

Paragraph 21. The method of any of paragraphs 18 to 20, wherein the indication of radio resources on the second carrier and the indication of radio resources on the first carrier are provided as separate indications.

Paragraph 22. The method of any of paragraphs 18 to 21, wherein each of the first and second carriers operate over a radio interface having a radio frame structure comprising a plurality of radio subframes comprising radio resource blocks arranged in time and frequency, and wherein the indication of radio resources for receiving user-plane data on the first carrier corresponds with a first radio resource block arrangement within a subframe of the first carrier and the indication of radio resources for receiving user-plane data on the second carrier corresponds with a second radio resource block arrangement within a subframe of the second carrier.

Paragraph 23. The method of paragraph 22, wherein the first radio resource block arrangement is the same as the second radio resource block arrangement.

Paragraph 24. The method of paragraph 22, wherein the first radio resource block arrangement is not the same as the second radio resource block arrangement.

Paragraph 25. The method of paragraph 24, further comprising deriving one of the first and second radio resource block arrangements from the other of the first and second radio resource block arrangements based on a predefined relationship between them.

Paragraph 26. The method of any of paragraphs 18 to 25, wherein the user-plane data received by the second terminal device on the second carrier is the same as the user-plane data received by the second terminal device on the first carrier.

Paragraph 27. The method of any of paragraphs 18 to 26, wherein the user-plane data received by the second terminal device on the second carrier is not the same as the user-plane data received by the second terminal device on the first carrier.

Paragraph 28. The method of any of paragraphs 18 to 27, wherein the control signalling further comprises an indication of whether or not the user-plane data received by the second terminal device on the second carrier is the same as the user-plane data received by the second terminal device on the first carrier.

Paragraph 29. The method of any of paragraphs 18 to 28, wherein the radio resources on the second carrier indicated by the control signalling are for times which are different from the times of the radio resources on the first carrier indicated by the control signalling.

Paragraph 30. The method of any of paragraphs 17 to 29, further comprising receiving on the second carrier control signalling comprising an indication of the radio resources on the second carrier to be used by th second terminal device for receiving user-plane data from the first terminal device.

Paragraph 31. A second terminal device for receiving data from a first terminal device in a device-to-device communication mode in a wireless telecommunications system supporting communications on a first carrier operating over a first frequency band and a second carrier operating over a second frequency band, wherein the second terminal device comprises a controller unit and a transceiver unit configured to operate together to:
  receive on the first carrier control signalling comprising an indication of radio resources on the second carrier to be used by the first terminal device for transmitting user-plane data to the second terminal device; and
  receive user-plane data from the first terminal device on the second carrier using the radio resources on the second carrier indicated by the control signalling.

Paragraph 32. Circuitry for a second terminal device for receiving data from a first terminal device in a device-to-device communication mode in a wireless telecommunications system supporting communications on a first carrier operating over a first frequency band and a second carrier operating over a second frequency band, wherein the circuitry comprises a controller element and a transceiver element configured to operate together to cause the second terminal device to:
  receive on the first carrier control signalling comprising an indication of radio resources on the second carrier to be used by the first terminal device for transmitting user-plane data to the second terminal device; and
  receive user-plane data from the first terminal device on the second carrier using the radio resources on the second carrier indicated by the control signalling.

Second Group of Numbered Paragraphs

Paragraph 1. A method of operating a first terminal device for transmitting data to a second terminal device in a device-to-device communication mode in a wireless telecommunications system supporting communications on a first carrier operating over a first frequency band and a second carrier operating over a second frequency band; the method comprising:
  transmitting on the first carrier control signalling comprising an indication that the first terminal device intends to transmit data to the second terminal device using the device-to-device communication mode on the second carrier after a carrier switch-over time; and
  after the carrier switch-over time, transmitting data to the second terminal device on the second carrier using the device-to-device communication mode.

Paragraph 2. The method of paragraph 1, wherein the control signalling conveys an indication of the carrier switch-over time.

Paragraph 3. The method of paragraph 2, wherein the carrier switch-over time is determined from a time associated with when the control signalling is transmitted.

Paragraph 4. The method of paragraph 3, wherein the carrier switch-over time corresponds with the time at which the control signalling is transmitted.

Paragraph 5. The method of paragraph 3, wherein the carrier switch-over time corresponds with the time at which the control signalling is transmitted plus a switch-over delay period.

Paragraph 6. The method paragraph 5, wherein the control signalling is transmitted by the first terminal device in one of a plurality of control signalling time windows defined in accordance with a control signalling schedule for the first terminal device, and wherein the carrier switch-over time is based on the time of a control signalling time window that follows the control signalling time window in which the control signalling is transmitted.

Paragraph 7. The method of any of paragraphs 2 to 6, wherein the control signalling comprises an explicit indication of the carrier switch-over time.

Paragraph 8. The method paragraph 7, wherein the control signalling is transmitted by the first terminal device in one of a plurality of control signalling time windows defined in accordance with a control signalling schedule for the first terminal device, and wherein the explicit indication of the carrier switch-over time comprises an indication of a control signalling time window that follows the control signalling time window in which the control signalling is transmitted, wherein the carrier switch-over time is based on the time of the indicated control signalling time window.

Paragraph 9. The method of any of paragraphs 1 to 8, further comprising after transmitting data to the second terminal device on the second carrier using the device-to-device communication mode, reverting to transmitting data to the second terminal device on the first carrier using the device-to-device communication mode after a carrier switch-back time.

Paragraph 10. The method of paragraph 9, wherein the control signalling conveys an indication of the carrier switch-back time.

Paragraph 11. The method of paragraph 10, wherein the carrier switch-back time is determined from a time associated with when the control signalling is transmitted.

Paragraph 12. The method of paragraph 11, wherein the carrier switch-back time corresponds with the time at which the control signalling is transmitted plus a switch-back delay period.

Paragraph 13. The method paragraph 12, wherein the control signalling is transmitted by the first terminal device in one of a plurality of control signalling time windows defined in accordance with a control signalling schedule for the first terminal device, and wherein the carrier switch-back time is based on the time of a control signalling time window that follows the control signalling time window in which the control signalling is transmitted.

Paragraph 14. The method of any of paragraphs 9 to 13, wherein the control signalling comprises an explicit indication of the carrier switch-back time.

Paragraph 15. The method paragraph 14, wherein the control signalling is transmitted by the first terminal device in one of a plurality of control signalling time windows defined in accordance with a control signalling schedule for the first terminal device, and wherein the explicit indication of the carrier switch-back time comprises an indication of a control signalling time window that follows the control signalling time window in which the control signalling is transmitted, wherein the carrier switch-back time is based on the time of the indicated control signalling time window.

Paragraph 16. The method of any of paragraphs 1 to 15, wherein the control signalling further comprises an indication of radio resources on the first carrier to be used for transmitting user-plane data from the first terminal device to the second terminal device before the carrier switch-over time.

Paragraph 17. The method of any of paragraphs 1 to 16, wherein the control signalling further comprises an indication of radio resources on the second carrier to be used for transmitting user-plane data from the first terminal device to the second terminal device after the carrier switch-over time.

Paragraph 18. A first terminal device for transmitting data to a second terminal device in a device-to-device communication mode in a wireless telecommunications system supporting communications on a first carrier operating over a first frequency band and a second carrier operating over a second frequency band, wherein the first terminal device comprises a controller unit and a transceiver unit configured to operate together to:
   transmit on the first carrier control signalling comprising an indication that the first terminal device intends to transmit data to the second terminal device using the device-to-device communication mode on the second carrier after a carrier switch-over time; and
   after the carrier switch-over time, transmit data to the second terminal device on the second carrier using the device-to-device communication mode.

Paragraph 19. Circuitry for a first terminal device for transmitting data to a second terminal device in a device-to-device communication mode in a wireless telecommunications system supporting communications on a first carrier operating over a first frequency band and a second carrier operating over a second frequency band, wherein the circuitry comprises a controller element and a transceiver element configured to operate together to cause the first terminal device to:
   transmit on the first carrier control signalling comprising an indication that the first terminal device intends to transmit data to the second terminal device using the device-to-device communication mode on the second carrier after a carrier switch-over time; and
   after the carrier switch-over time, transmit data to the second terminal device on the second carrier using the device-to-device communication mode.

Paragraph 20. A method of operating a second terminal device for receiving data from a first terminal device in a device-to-device communication mode in a wireless telecommunications system supporting communications on a first carrier operating over a first frequency band and a second carrier operating over a second frequency band; the method comprising:
   receiving on the first carrier control signalling comprising an indication that the first terminal device intends to transmit data to the second terminal device using the device-to-device communication mode on the second carrier after a carrier switch-over time; and
   after the carrier switch-over time, receiving data from the terminal device on the second carrier using the device-to-device communication mode.

Paragraph 21. The method of paragraph 20, wherein the control signalling conveys an indication of the carrier switch-over time.

Paragraph 22. The method of paragraph 21, wherein the carrier switch-over time is determined from a time associated with when the control signalling is received.

Paragraph 23. The method of paragraph 22, wherein the carrier switch-over time corresponds with the time at which the control signalling is received.

Paragraph 24. The method of paragraph 22, wherein the carrier switch-over time corresponds with the time at which the control signalling is received plus a switch-over delay period.

25. The method paragraph 24, wherein the control signalling is received by the second Paragraph terminal device in one of a plurality of control signalling time windows defined in accordance with a control signalling schedule for the first terminal device, and wherein the carrier switch-over time is based on the time of a control signalling time window that follows the control signalling time window in which the control signalling is received.

Paragraph 26. The method of any of paragraphs 21 to 25, wherein the control signalling comprises an explicit indication of the carrier switch-over time.

Paragraph 27. The method paragraph 26, wherein the control signalling is received by the second terminal device in one of a plurality of control signalling time windows defined in accordance with a control signalling schedule for the first terminal device, and wherein the explicit indication of the carrier switch-over time comprises an indication of a control signalling time window that follows the control signalling time window in which the control signalling is received, wherein the carrier switch-over time is based on the time of the indicated control signalling time window.

Paragraph 28. The method of any of paragraphs 20 to 27, further comprising after receiving data from the first terminal device on the second carrier using the device-to-device communication mode, reverting to receiving data from the first terminal device on the first carrier using the device-to-device communication mode after a carrier switch-back time.

Paragraph 29. The method of paragraph 28, wherein the control signalling conveys an indication of the carrier switch-back time.

Paragraph 30. The method of paragraph 29, wherein the carrier switch-back time is determined from a time associated with when the control signalling is received.

Paragraph 31. The method of paragraph 30, wherein the carrier switch-back time corresponds with the time at which the control signalling is received plus a switch-back delay period.

Paragraph 32. The method paragraph 31, wherein the control signalling is received by the second terminal device in one of a plurality of control signalling time windows defined in accordance with a control signalling schedule for the first terminal device, and wherein the carrier switch-back time is based on the time of a control signalling time window that follows the control signalling time window in which the control signalling is received.

Paragraph 33. The method of any of paragraphs 28 to 32, wherein the control signalling comprises an explicit indication of the carrier switch-back time.

Paragraph 34. The method paragraph 33, wherein the control signalling is received by the second terminal device in one of a plurality of control signalling time windows defined in accordance with a control signalling schedule for the first terminal device, and wherein the explicit indication of the carrier switch-back time comprises an indication of a control signalling time window that follows the control signalling time window in which the control signalling is received, wherein the carrier switch-back time is based on the time of the indicated control signalling time window.

Paragraph 35. The method of any of paragraphs 20 to 34, wherein the control signalling further comprises an indication of radio resources on the first carrier to be used by the second terminal device for receiving user-plane data from the first terminal device before the carrier switch-over time.

Paragraph 36. The method of any of paragraphs 20 to 35, wherein the control signalling further comprises an indication of radio resources on the second carrier to be used by the second terminal device for receiving user-plane data from the first terminal device before the carrier switch-over time.

Paragraph 37. A second terminal device for receiving data from a first terminal device in a device-to-device communication mode in a wireless telecommunications system supporting communications on a first carrier operating over a first frequency band and a second carrier operating over a second frequency band; wherein the second terminal device comprises a controller unit and a transceiver unit configured to operate together to receive on the first carrier control signalling comprising an indication that the first terminal device intends to transmit data to the second terminal device using the device-to-device communication mode on the second carrier after a carrier switch-over time; and after the carrier switch-over time, receive data from the terminal device on the second carrier using the device-to-device communication mode.

Paragraph 38. Circuitry for a second terminal device for receiving data from a first terminal device in a device-to-device communication mode in a wireless telecommunications system supporting communications on a first carrier operating over a first frequency band and a second carrier operating over a second frequency band, wherein the circuitry comprises a controller element and a transceiver element configured to operate together to cause the second terminal device to:

receive on the first carrier control signalling comprising an indication that the first terminal device intends to transmit data to the second terminal device using the device-to-device communication mode on the second carrier after a carrier switch-over time; and after the carrier switch-over time, receive data from the terminal device on the second carrier using the device-to-device communication mode.

REFERENCES

[1] LTE for UMTS: OFDMA and SC-FDMA Based Radio Access, Harris Holma and Antti Toskala, Wiley 2009, ISBN 978-0-470-99401-6.
[2] R2-133840, "CSMA/CA based resource selection," Samsung, published at 3GPP TSG-RAN WG2 #84, San Francisco, USA, 11-15 Nov. 2013.
[3] R2-133990, "Network control for Public Safety D2D Communications", Orange, Huawei, HiSilicon, Telecom Italia, published at 3GPP TSG-RAN WG2 #84, San Francisco, USA, 11-15 Nov. 2013.
[4] R2-134246, "The Synchronizing Central Node for Out of Coverage D2D Communication", General Dynamics Broadband UK, published at 3GPP TSG-RAN WG2 #84, San Francisco, USA, 11-15 Nov. 2013.
[5] R2-134426, "Medium Access for D2D communication", LG Electronics Inc, published at 3GPP TSG-RAN WG2 #84, San Francisco, USA, 11-15 Nov. 2013.
[6] R2-134238, "D2D Scheduling Procedure", Ericsson, published at 3GPP TSG-RAN WG2 #84, San Francisco, USA, 11-15 Nov. 2013.
[7] R2-134248, "Possible mechanisms for resource selection in connectionless D2D voice communication", General Dynamics Broadband UK, published at 3GPP TSG-RAN WG2 #84, San Francisco, USA, 11-15 Nov. 2013.
[8] R2-134431, "Simulation results for D2D voice services using connectionless approach", General Dynamics Broadband UK, published at 3GPP TSG-RAN WG2 #84, San Francisco, USA, 11-15 Nov. 2013.
[9] "D2D Resource Allocation under the Control of BS", Xiaogang R. et al, University of Electronic Science and Technology of China, https //mentor.ieee.org/802.16/dcn/13/16-13-0123-02-000n-d2d-resource-allocation-under-the-control-of-bs.docx
[10] US 2013/0170387
[11] US 2012/0300662

The invention claimed is:

1. A method of operating a first terminal device for transmitting data to a second terminal device in a device-to-device communication mode in a $3^{rd}$ Generation Partnership Project (3GPP) standard-compliant wireless telecommunications system, the method comprising:

transmitting, on a physical downlink control channel (PDCCH) of a first carrier operating in a first frequency band, control signaling comprising an indication of time and frequency of radio resources on a second carrier operating over a second frequency band to be used for transmitting user-plane data directly from the first terminal device to the second terminal device, wherein the first frequency band is a licensed frequency band in the 3GPP standard-compliant wireless telecommunications system, and the second frequency band is an unlicensed band in the 3GPP standard-compliant wireless telecommunications system; and transmitting user-plane data directly to the second terminal device on the second carrier using the radio resources on the second carrier indicated by the control signaling.

2. The method of claim 1, wherein the control signaling further comprises an indication of radio resources on the first carrier to be used for transmitting user-plane data from the first terminal device to the second terminal device, and the method further comprises transmitting user-plane data to the second terminal device on the first carrier using the radio resources on the first carrier indicated by the control signaling.

3. The method of claim 2, wherein the each of the first and second carriers operate over a radio interface having a radio frame structure comprising a plurality of radio subframes, and control signaling in each radio subframe of the first carrier comprises an indication of whether the control signaling is providing:

(i) an indication of radio resources on the first carrier to be used for transmitting user-plane data from the first terminal device to the second terminal device; or (ii) an indication of radio resources on the second carrier to be used for transmitting user-plane data from the first terminal device to the second terminal device; or (iii) an indication of radio resources on both the first and second carriers to be used for transmitting user-plane data from the first terminal device to the second terminal device.

4. The method of claim 2, wherein
each of the first and second carriers operate over a radio interface having a radio frame structure comprising a plurality of radio subframes comprising radio resource blocks arranged in time and frequency, and
the indication of radio resources for transmitting user-plane data on the first carrier corresponds with a first radio resource block arrangement within a subframe of the first carrier and the indication of radio resources for transmitting user-plane data on the second carrier corresponds with a second radio resource block arrangement within a subframe of the second carrier.

5. The method of claim 4, wherein the first radio resource block arrangement is the same as the second radio resource block arrangement.

6. The method of claim 4, wherein the first radio resource block arrangement is not the same as the second radio resource block arrangement.

7. The method of claim 6, further comprising:
deriving one of the first and second radio resource block arrangements from the other of the first and second radio resource block arrangements based on a pre-defined relationship between them.

8. The method of claim 2, wherein the user-plane data transmitted to the second terminal device on the second carrier is the same as the user-plane data transmitted to the second terminal device on the first carrier.

9. The method of claim 2, wherein the user-plane data transmitted to the second terminal device on the second carrier is not the same as the user-plane data transmitted to the second terminal device on the first carrier.

10. The method of claim 2, wherein the control signaling further comprises an indication of whether or not the user-plane data transmitted to the second terminal device on the second carrier is the same as the user-plane data transmitted to the second terminal device on the first carrier.

11. The method of claim 2, wherein the radio resources on the second carrier indicated by the control signaling are for times which are different from the times of the radio resources on the first carrier indicated by the control signaling.

12. The method of claim 1, further comprising:
transmitting on the second carrier control signaling comprising an indication of the radio resources on the second carrier to be used for transmitting user-plane data from the first terminal device to the second terminal device.

13. A first terminal device for transmitting data to a second terminal device in a device-to-device communication mode in a $3^{rd}$ Generation Partnership Project (3GPP) standard-compliant wireless telecommunications system, the first terminal device comprising:
circuitry configured to:
transmit, on a physical downlink control channel (PDCCH) of a first carrier operating in a first frequency band, control signaling comprising an indication of time and frequency of radio resources on the second carrier operating over a second frequency band to be used for transmitting user-plane data directly from the first terminal device to the second terminal device, wherein
the first frequency band is a licensed frequency band in the 3GPP standard-compliant wireless telecommunications system, and the second frequency band is an unlicensed band in the 3GPP standard-compliant wireless telecommunications system; and
transmit user-plane data directly to the second terminal device on the second carrier using the radio resources on the second carrier indicated by the control signaling.

14. Circuitry for a first terminal device for transmitting data to a second terminal device in a device-to-device communication mode in a $3^{rd}$ Generation Partnership Project (3GPP) standard-compliant wireless telecommunications system, wherein the circuitry comprises:
a controller element and a transceiver element configured to operate together to cause the first terminal device to:
transmit, on a physical downlink control channel (PDCCH) of a first carrier operating in a first frequency band, control signaling comprising an indication of time and frequency of radio resources on the second carrier operating over a second frequency band to be used for transmitting user-plane data directly from the first terminal device to the second terminal device, wherein
the first frequency band is a licensed frequency band in the 3GPP standard-compliant wireless telecommunications system, and the second frequency band is an unlicensed band in the 3GPP standard-compliant wireless telecommunications system; and
transmit user-plane data directly to the second terminal device on the second carrier using the radio resources on the second carrier indicated by the control signaling.

15. A method of operating a second terminal device for receiving data from a first terminal device in a device-to-device communication mode in a $3^{rd}$ Generation Partnership Project (3GPP) standard-compliant wireless telecommunications system, the method comprising:
receiving on a physical downlink control channel (PDCCH) of a first carrier operating in a first frequency band, control signaling comprising an indication of time and frequency radio resources on the second carrier operating over a second frequency band to be used by the first terminal device for transmitting user-plane data directly to the second terminal device, wherein
the first frequency band is a licensed frequency band in the 3GPP standard-compliant wireless telecommunications system, and the second frequency band is an unlicensed band in the 3GPP standard-compliant wireless telecommunications system; and
receiving user-plane data directly from the first terminal device on the second carrier using the radio resources on the second carrier indicated by the control signaling.

* * * * *